US012742512B2

(12) United States Patent
Zhang et al.

(10) Patent No.: US 12,742,512 B2
(45) Date of Patent: Sep. 22, 2026

(54) CONNECTOR ASSEMBLY

(71) Applicant: A. RAYMOND ET CIE, Grenoble (FR)

(72) Inventors: Chao Zhang, Suzhou (CN); Feng Que, Suzhou (CN)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 19/115,537

(22) PCT Filed: Sep. 26, 2023

(86) PCT No.: PCT/CN2023/121503
§ 371 (c)(1),
(2) Date: Mar. 26, 2025

(87) PCT Pub. No.: WO2024/067572
PCT Pub. Date: Apr. 4, 2024

(65) Prior Publication Data

US 2026/0104121 A1 Apr. 16, 2026

(30) Foreign Application Priority Data

Sep. 27, 2022 (CN) ......................... 202222563307.5
Sep. 1, 2023 (CN) ......................... 202322379259.9

(51) Int. Cl.
*F16L 37/252* (2006.01)
*F16L 37/32* (2006.01)

(52) U.S. Cl.
CPC ............. *F16L 37/252* (2013.01); *F16L 37/32* (2013.01)

(58) Field of Classification Search
CPC ....... F16L 37/10; F16L 37/101; F16L 37/107; F16L 37/113; F16L 37/24; F16L 37/244; F16L 37/248; F16L 37/252
See application file for complete search history.

(56) References Cited

U.S. PATENT DOCUMENTS 7,731,243 B2 6/2010 Tiberghien et al.
9,119,947 B2 * 9/2015 Tsao ................... A61M 39/1011
2013/0320668 A1 * 12/2013 Cheon ..................... F16L 37/23 285/148.1

FOREIGN PATENT DOCUMENTS

CN 113566040 A * 10/2021 ............ F16L 37/244
CN 215891524 U * 2/2022
FR 2810388 B1 * 8/2002

OTHER PUBLICATIONS

International Search Report for PCT/CN2023/121503 dated Jan. 26, 2024, 4 pages.

(Continued)

*Primary Examiner* — Aaron M Dunwoody
(74) *Attorney, Agent, or Firm* — WARNER NORCROSS + JUDD LLP

(57) ABSTRACT

A connector assembly includes a first connector and a second connector. The first connector includes a first connector body and a locking sleeve. The locking sleeve is rotatably retained on the first connector body and includes a locking slot and a guiding protrusion. The locking slot is provided in a tubular wall of the locking sleeve, and the guiding protrusion is arranged at an axial end of the tubular wall and is adjacent to the locking slot. The second connector includes a second connector body, and the second connector body includes a locking protrusion arranged at its outer periphery. During the insertion of the second connector body between the locking sleeve and the first connector body along the axial direction, the locking sleeve can rotate responsive to the locking protrusion pushing the guiding protrusion, allowing the locking protrusion to move along the guiding protrusion and into the locking slot.

25 Claims, 19 Drawing Sheets

(56) References Cited

OTHER PUBLICATIONS

Written Opinion for PCT/CN2023/121503 dated Jan. 26, 2024, 7 pages.

Machine assisted English translation of CN113566040A obtained from <https://worldwide.espacenet.com/patent> on Jun. 16, 2025, 23 pages.

* cited by examiner 10
100
120
212
200
112
214

CONNECTOR ASSEMBLY

CROSS-REFERENCE TO RELATED APPLICATIONS

This application is the U.S. National Stage of International Application No. PCT/CN2023/121503 filed on 26 Sep. 2023, which claims priority to and all advantages of Chinese Utility Model application No. 202322379259.9 filed on 1 Sep. 2023 and Chinese Utility Model application No. 202222563307.5 filed on 29 Sep. 2022, the contents of which are incorporated herein by reference.

RELATED FIELD

The present application generally relates to a connector assembly for establishing fluid communication.

BACKGROUND

A connector assembly can be used to establish fluid communication between fluid pipelines or between fluid communicating components in various application scenarios. The connector assembly generally includes a female connector and a male connector, each of which is directly or indirectly connected to a fluid pipeline or a fluid communicating component. The male connector can be inserted into the female connector to establish fluid communication between the fluid pipelines or between the fluid communicating components.

In some application scenarios, it is desirable to quickly and conveniently complete the connection between the female connector and the male connector in a small installation space. Currently, a connector assembly that can realize the connection between the female connector and the male connector by inserting the male connector into the female connector has been developed. However, for such connector assembly, it is generally necessary to first intentionally adjust the relative position relationship between the female connector and the male connector in the circumferential direction before inserting the male connector into the female connector, which increases the difficulty in connecting the female connector with the male connector.

In addition, it is desirable that female and male connectors can be adapted to a variety of fluid pipelines or fluid communicating components to expand the application scenarios of the connector assembly. It is further desirable that the female connector and the male connector have good structural strength such that: for example, the female connector and the male connector can still maintain structural integrity without deformation or damage when the fluid pipelines or fluid communicating components swing or shake due to external vibration and other factors.

SUMMARY

It is an object of the present application is to provide an improved connector assembly to overcome one or more of the problems described in the background.

The present application provides a connector assembly which includes a first connector and a second connector for being connected with the first connector. The first connector includes a first connector body and a locking sleeve. The first connector body defines an axial direction. The locking sleeve is sleeved outside the first connector body and retained on the first connector body in a rotatable manner. The locking sleeve includes a locking slot defined/provided in a tubular wall of the locking sleeve and a guiding protrusion arranged at an axial end of the tubular wall and adjacent to the locking slot. The second connector includes a second connector body configured to be adapted to be inserted between the locking sleeve and the first connector body along the axial direction, and the second connector body includes a locking protrusion arranged at its outer periphery. The locking sleeve is configured such that: during the insertion of the second connector body between the locking sleeve and the first connector body along the axial direction, the locking sleeve rotates in response to the locking protrusion pushing the guiding protrusion, to allow the locking protrusion to move along the guiding protrusion and into the locking slot, wherein the locking protrusion is adapted to the locking slot to prevent the second connector body from disengaging from the locking sleeve.

According to the connector assembly of the present application, since guiding protrusion(s) is/are provided at the axial end of the locking sleeve, the locking protrusion(s) can be guided by the guiding protrusion(s) to smoothly enter the locking slot(s) even if the locking protrusion(s) is/are not aligned with the locking slot(s) during the connection of the first connector with the second connector, thereby achieving blind-mating connection between the first connector and the second connector.

According to the above technical concept, the present application may further include one or more of the following optional forms.

In some optional forms, the locking slot includes a guiding segment and a locking segment that meet each other. The guiding protrusion is adapted to guide the locking protrusion into the guiding segment, and the locking sleeve is configured to rotate in response to the locking protrusion pushing the guiding segment to allow the locking protrusion to move along the guiding segment and into the locking segment. The locking protrusion can engage the locking segment to prevent the second connector body from disengaging from the locking sleeve.

In some optional forms, the guiding protrusion includes a guiding surface for guiding the locking protrusion into the locking slot.

In some optional forms, the locking sleeve includes multiple locking slots and multiple corresponding guiding protrusions. The multiple locking slots are spaced apart in a circumferential direction of the locking sleeve, and each guiding protrusion is arranged between two adjacent locking slots in the circumferential direction.

In some optional forms, the guiding protrusion includes two guiding surfaces each for guiding the locking protrusion into a corresponding locking slot of two adjacent locking slots.

In some optional forms, the guiding protrusion protrudes substantially parallel to the axial direction and tapers in a direction away from the locking sleeve to form the two guiding surfaces on two opposite sides of the guiding protrusion in the circumferential direction.

In some optional forms, the two guiding surfaces of the guiding protrusion meet each other.

In some optional forms, the guiding surface meets a side wall of the locking slot.

In some optional forms, the guiding surface is at an acute angle with respect to a plane perpendicular to the axial direction.

In some optional forms, the acute angle ranges between 30° and 60°.

In some optional forms, the locking sleeve includes an extending portion. The extending portion is arranged on the tubular wall and extends across the locking slot and/or a gap between adjacent guiding protrusions.

In some optional forms, the extending portion extends along an entire circumference of the locking sleeve.

In some optional forms, the first connector body includes a tubular first section and a tubular second section. The first section is at least partially received in the second section and is connected to the second section. The first section includes at least one outer bearing surface arranged on its outer side. The second section includes at least one inner bearing surface arranged on its inner side. Each outer bearing surface is adapted to abut against a corresponding inner bearing surface to bear a lateral load substantially perpendicular to an axial direction of the first section at a joint between the first section and the second section. The at least one outer bearing surface and the at least one inner bearing surface extend nonparallel to the direction of the lateral load. The outer bearing surface and the inner bearing surface capable of abutting against each other may bear and share the lateral load at the joint between the first section and the second section when the first connector is subjected to, for example, a lateral force, so as to avoid stress concentration at the joint between the first section and the second section, thereby avoiding deformation of or damage to the first section and/or the second section, and further improving the resistance of the first connector to lateral forces and the connection reliability of the first section and the second section.

In some optional forms, the at least one outer bearing surface and the at least one inner bearing surface are planar; and/or the at least one outer bearing surface and the at least one inner bearing surface extend substantially perpendicular to the direction of the lateral load.

In some optional forms, the first section includes at least one rib arranged on its outer side. Each rib includes a first end surface and a second end surface in a circumferential direction of the first section, and wherein the first end surface and/or the second end surface of the at least one rib form one or more of the at least one outer bearing surface.

In some optional forms, the first and second end surfaces of the rib are parallel to each other.

In some optional forms, the second section includes at least one engaging protrusion arranged on its inner side. The at least one outer bearing surface includes at least one first outer bearing surface formed by the first end surface of the rib. The at least one inner bearing surface includes at least one first inner bearing surface formed by a surface of the engaging protrusion. Each first outer bearing surface is adapted to abut against a corresponding first inner bearing surface.

In some optional forms, the at least one rib includes a first rib and a second rib which are adjacent to each other and spaced apart from each other in the circumferential direction of the first section. The first outer bearing surface formed by the first end surface of the first rib is adapted to abut against the first inner bearing surface formed by a first side surface of a corresponding engaging protrusion of the at least one engaging protrusion. The first outer bearing surface formed by the first end surface of the second rib is adapted to abut against the first inner bearing surface formed by a second side surface of the corresponding engaging protrusion opposite to the first side surface.

In some optional forms, the at least one outer bearing surface includes at least one second outer bearing surface formed by the second end surface of the rib. The at least one inner bearing surface includes at least one second inner bearing surface formed by part of an inner surface of the second section. Each second outer bearing surface is adapted to abut against a corresponding second inner bearing surface.

In some optional forms, the first connector body includes a tubular first section and a tubular second section. The second section includes a receiving end. The first section is adapted to be at least partially inserted into the second section in an insertion direction via the receiving end and be connected to the second section.

In some optional forms, the first section includes multiple abutting projections spaced circumferentially apart from each other; and the second section includes multiple abutting cantilevers spaced circumferentially apart from each other. Each abutting projection is adapted to abut against a free end of a corresponding abutting cantilever to limit movement of the first section relative to the second section in a direction opposite to the insertion direction.

In some optional forms, the abutting cantilever has a substantially uniform thickness.

In some optional forms, the abutting cantilever extends from the receiving end toward an interior of the second section at an acute angle with respect to the insertion direction.

In some optional forms, the second section includes multiple windows spaced circumferentially apart from each other. Each abutting cantilever is located in a corresponding window. Each abutting projection is adapted to abut against an edge of a corresponding window to limit movement of the first section relative to the second section in the insertion direction.

In some optional forms, the first section includes a first annular stepped portion on its outer side. The second section includes a second annular stepped portion on its inner side. The first connector includes a sealing member, and the first annular stepped portion and the second annular stepped portion together define an accommodating space for accommodating the sealing member.

In some optional forms, the first section has an axial end inserted into the second section, and the axial end of the first section includes an outer chamfer.

In some optional forms, the second section is in the form of an elbow tube. The first section has an axial end inserted into the second section, and the axial end of the first section is located at a turning of the second section. A circumferential wall of the first section is provided with a communicating port at the axial end of the first section, and the first section is in fluid communication with the second section via the communicating port.

In some optional forms, the second connector body includes a tubular first portion and a tubular second portion. The first portion is at least partially received in the second portion and is connected to the second portion. The first portion includes multiple engaging projections spaced circumferentially apart from each other. The second portion includes a tubular main body and multiple snapping lugs extending substantially axially from the main body and spaced circumferentially apart from each other. Each snapping lug includes an engaging opening. Each engaging projection is adapted to engage with the engaging opening of a corresponding snapping lug, to limit movement of the first portion relative to the second portion.

In some optional forms, the multiple snapping lugs include a first snapping lug which includes a first stiffening projection projecting substantially axially into the engaging opening of the first snapping lug; and/or the multiple snapping lugs include a second snapping lug which includes a second stiffening projection adjacent to the engaging opening of the second snapping lug and projecting substantially radially outward.

The connector assembly according to the present application can achieve the blind-mating connection between the first connector and the second connector, and the connection operation therefor is convenient, so that it is especially suitable for the application scenarios where the assembly space is limited.

BRIEF DESCRIPTION OF THE DRAWINGS

Other features and advantages of the present application will be readily understood through the following preferred embodiments described in detail with reference to the accompanying drawings, in which the same reference numerals indicate the same or similar components.

DETAILED DESCRIPTION

Figure 1:
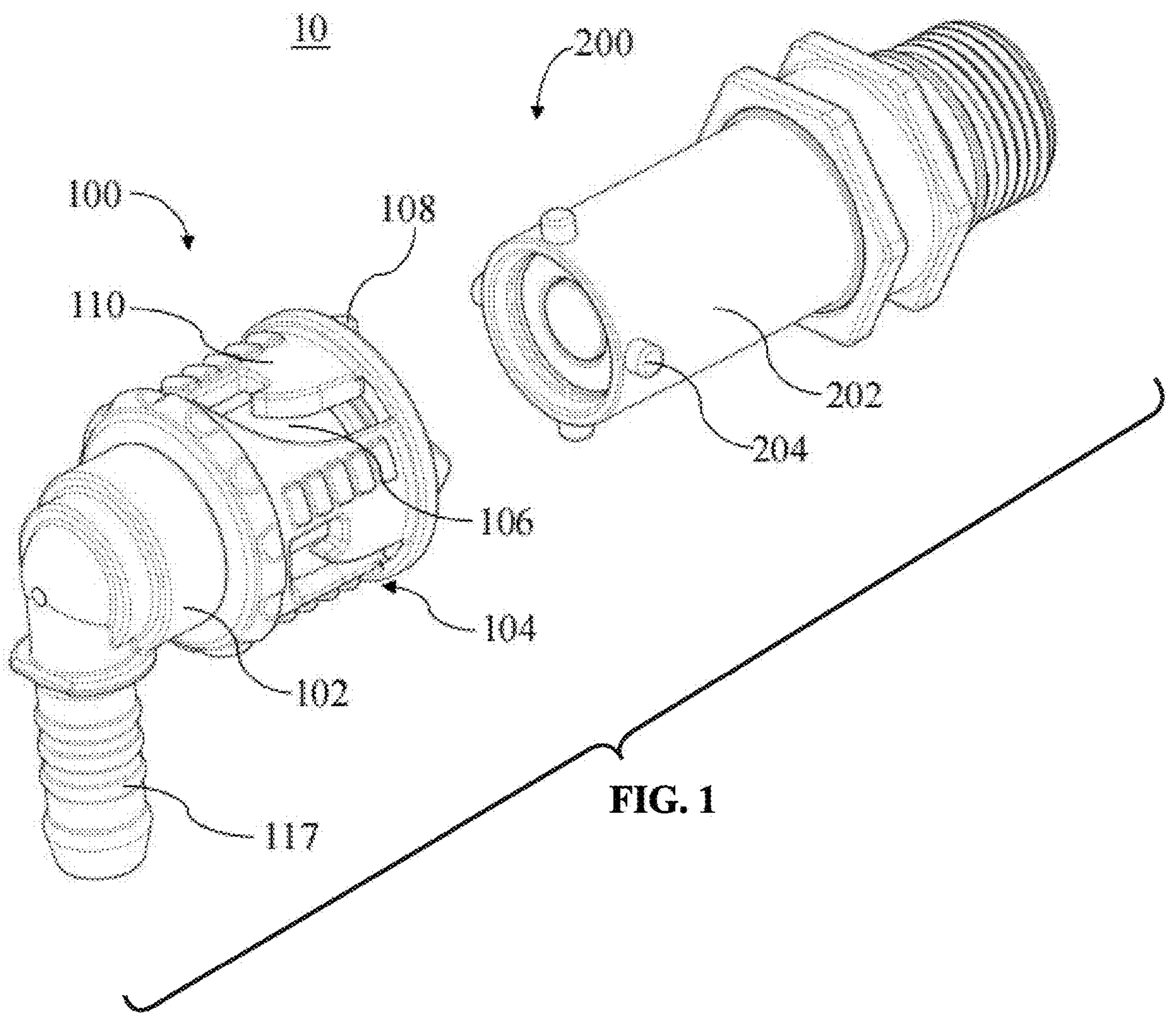
FIG. 1 is a perspective view of a connector assembly according to a first embodiment of the present application.

The implementation and usage of the embodiments are discussed in detail below. However, it is conceivable that the specific embodiments discussed herein are merely intended to illustrate specific ways of implementing and using the present application, and are not intended to limit the scope of protection of the present application. When describing structures and positions of components, the direction-related expressions herein, such as “upper”, “lower”, “top”, and “bottom”, are not absolute, but relative. When the components are arranged as shown in the drawings, these direction-related expressions are appropriate, but when the positions of these components in the drawings are altered, these direction-related expressions should be altered accordingly.

In the present application, an axial direction of a tubular, cylindrical, or annular component refers to a direction along the central axis of the component, a circumferential direction of the tubular, cylindrical, or annular component refers to a direction along the circumference of the component, and a radial direction of the tubular, cylindrical, or annular component refers to a direction passing through the central axis of the component and perpendicular to the axial direction of the component.

The terms, such as "first" and "second", are only used for descriptive purposes, and should not be construed as indicating or implying relative importance or implicitly indicating the number of the technical features referred to. In the present application, unless otherwise specified, the terms, such as "install", "join", "connect", and "fix", should be understood in a broad sense. For example, "connect" may be "permanently connect", "detachably connect", or "integrally connect", or may be "directly connect" or "indirectly connect via an intermediary". For those skilled in the art, specific meanings of the above terms in the present application should be understood according to specific circumstances.

FIGS. 1 to 8B show a connector assembly 10 and its components according to the first embodiment of the present application.

Referring to FIGS. 1 and 2, the connector assembly 10 includes a first connector 100 and a second connector 200 for being connected with the first connector 100. The first connector 100 includes a first connector body 102 and a locking sleeve 104. The first connector body 102 defines a first axial direction A1. The locking sleeve 104 is sleeved outside the first connector body 102 and retained/held on the first connector body 102 in a rotatable manner. The locking sleeve 104 includes locking slots 106 and guiding protrusions 108. The locking slots 106 are defined in a tubular wall 110 of the locking sleeve 104. The guiding protrusions 108 are arranged at an axial end of the tubular wall 110 and adjacent to the locking slots 106. The second connector 200 includes a second connector body 202. The second connector body 202 is configured to be adapted to be inserted between the locking sleeve 104 and the first connector body 102 along the first axial direction A1. The second connector body 202 includes locking protrusions 204 arranged at its outer periphery. The locking sleeve 104 is configured such that: while the second connector body 202 is inserted between the locking sleeve 104 and the first connector body 102 along the first axial direction A1 (i.e., during the insertion of the second connector body 202 between the locking sleeve 104 and the first connector body 102 along the first axial direction A1), the locking sleeve 104 rotates in response to the locking protrusions 204 pushing the guiding protrusions 108, to allow the locking protrusions 204 to move along the guiding protrusions 108 and into the locking slots 106. The locking protrusions 204 can engage with the locking slots 106 to prevent the second connector body 202 from disengaging from the locking sleeve 104.

Figure 2A:
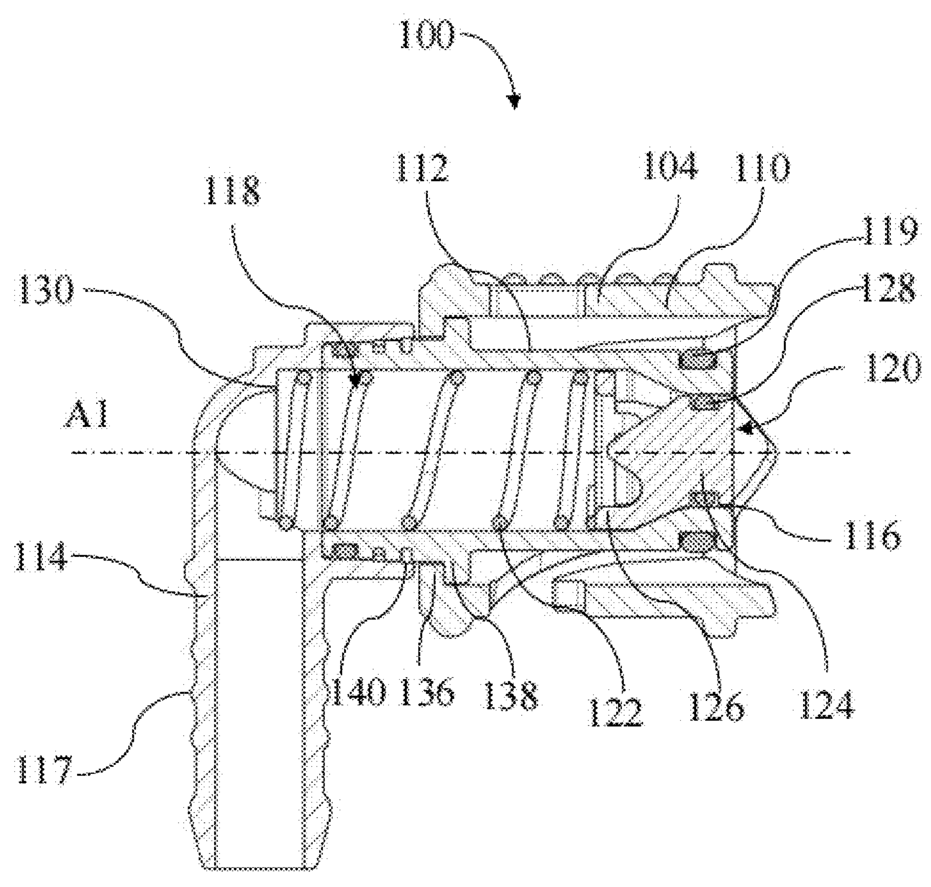
FIGS. 2A and 2B are cross-sectional views of a first connector and a second connector of the connector assembly according to the first embodiment of the present application, respectively.

As shown in FIG. 2A, the first connector body 102 of the first connector 100 may include a first section 112 and a second section 114. In the first embodiment, both the first section 112 and the second section 114 are substantially tubular.

The first section 112 defines the first axial direction A1, and at least part of the first section 112 is received in and fixed to the second section 114. One end of the first section 112 defines a port 116 (more clearly shown in FIG. 8B), and the other end of the first section 112 is fixed to the second section 114. The first section 112 and the second section 114 may be fixed to each other by interference fit, snap fit, welding or any combination thereof. One end of the second section 114 is configured for receiving the first section 112, and the other end of the second section 114 may be directly connected to a fluid pipeline (not shown) for fluid communication with the fluid pipeline. The other end of the second section 114 may include multiple circumferential annular flanges 117 arranged on its outer periphery, so that a hose, for example, can remain connected to the second section 114 through the multiple annular flanges 117.

The first connector 100 may further include a valve unit 118. The valve unit 118 may be arranged in the first section 112 of the first connector body 102 and configured for controlling the opening and closing of a flow path of the first connector 100. The outer periphery of the first section 112 may be provided with a sealing member 119 for sealing contact with the inner periphery of the second connector body 202 of the second connector 200, as shown in FIG. 8B.

With further reference to FIG. 2A, the valve unit 118 may include a valve core 120 and an elastic member 122. The valve core 120 is movable in the first axial direction A1 between a first closed position (shown in FIG. 4B) and a first open position (shown in FIG. 8B). The elastic member 122 can bias the valve core 120 toward the first closed position. When the valve core 120 is in the first closed position, the valve core 120 blocks the port 116 to close the flow path of the first connector 100, and when the valve core 120 is in the first open position, the valve core 120 is moved away from the port 116 to open the flow path of the first connector 100.

The valve core 120 may include a valve core head 124 and a bracket 126. A sealing member 128 may be provided between the outer periphery of the valve core head 124 and the inner periphery of the first section 112. In the first embodiment, the sealing member 128 is embedded in the outer periphery of the valve core head 124 for sealing contact with the inner periphery of the port 116. The elastic member 122 may be in the form of a coil spring. One end of the elastic member 122 may abut against the bracket 126 of the valve core 120, and the other end of the elastic member 122 may abut against an inner stepped portion 130 of the second section 114, so as to bias the valve core 120 toward the first closed position for blocking the port 116. When the valve core 120 is biased in the first closed position by the elastic member 122, the sealing member 128 of the valve core head 124 is in sealing contact with the inner periphery of the port 116, so that the flow path of the first connector 100 is closed. When the valve core 120 is pushed by an external force along the first axial direction A1, the valve core 120 can move away from the port 116 to the first open position against the elastic force of the elastic member 122, so that the flow path of the first connector 100 is opened.

Figure 3A:
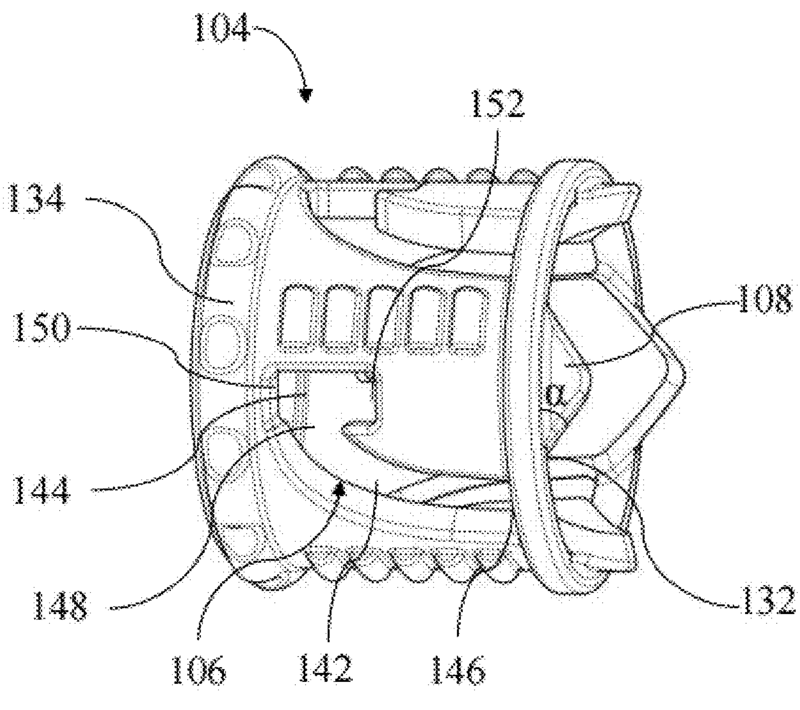
FIG. 3A and FIG. 3B respectively are perspective views of a locking sleeve of the first connector of the connector assembly according to the first embodiment of the present application, viewed from different perspectives.
Figure 3B:
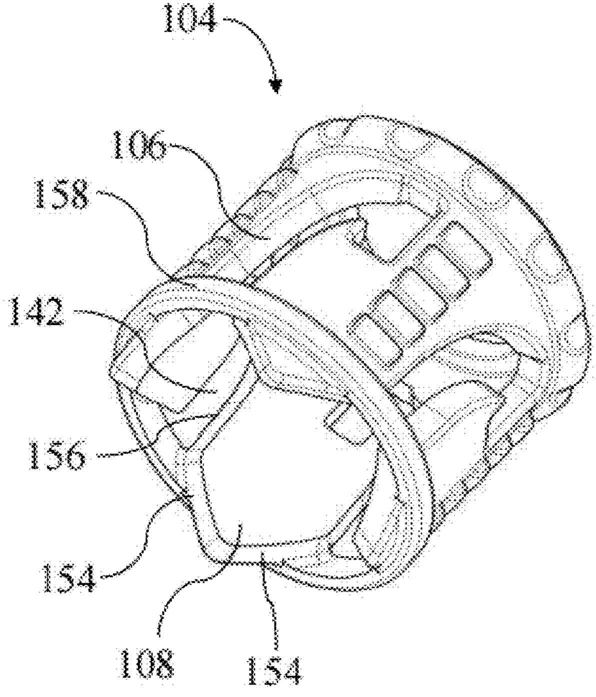

As shown in FIGS. 2A, 3A and 3B, the locking sleeve 104 may be coaxially sleeved outside the first section 112 of the first connector body 102 in a rotatable manner (in other words, the axial direction of the locking sleeve 104 coincides with/is the same as the first axial direction A1 of the first connector body 102), to allow the locking sleeve 104 to rotate relative to the first connector body 102. The tubular wall 110 of the locking sleeve 104 has a first axial end 132 and a second axial end 134.

At least part of the locking sleeve 104 is confined between the first section 112 and the second section 114 of the first connector body 102 in the first axial direction A1, to limit the axial position of the locking sleeve 104 on the first connector body 102. The locking sleeve 104 has a shoulder 136 extending radially inward from the tubular wall 110. The first section 112 may have a first limiting portion 138 arranged on its outer periphery. The second section 114 may have a second limiting portion 140. The shoulder 136 of the locking sleeve 104 may be confined between the first limiting portion 138 and the second limiting portion 140 in the first axial direction A1. In the first embodiment, the first limiting portion 138 of the first section 112 may be in the form of an annular flange, the second limiting portion 140 of the second section 114 may be an end portion of the second section 114, and the shoulder 136 of the locking sleeve 104 may be in an annular shape and located at the second axial end 134 of the tubular wall 110.

The locking slot 106 of the locking sleeve 104 may include a guiding segment 142 and a locking segment 144 that meet/adjoin each other. The guiding protrusion 108 is used for guiding the locking protrusion 204 into the guiding segment 142 of the locking slot 106. The locking sleeve 104 is configured to rotate in response to the locking protrusions 204 pushing the guiding segments 142, to allow the locking protrusions 204 to move along the guiding segments 142 and into the locking segments 144. The locking protrusions 204 can engage with the locking segments 144 to prevent the second connector body 202 from disengaging from the locking sleeve 104. The locking slots 106 of the locking sleeve 104 may penetrate through the tubular wall 110.

In the first embodiment, the guiding segment 142 may extend from the first axial end 132 toward the second axial end 134, and have an arc shape. The guiding segment 142 may have an inlet end 146 and an outlet end 148, the inlet end 146 being closer to the first axial end 132 of the tubular wall 110 than the outlet end 148. At least part of the locking segment 144 may extend from the outlet end 148 of the guiding segment 142 toward the first axial end 132 in a direction parallel to the first axial direction A1. In the first embodiment, the locking segment 144 may have a positioning end 150 and a locking end 152 opposing each other, the locking end 152 being closer to the first axial end 132 of the tubular wall 110 than the positioning end 150. The guiding protrusion 108 of the locking sleeve 104 may be provided at the first axial end 132 of the tubular wall 110 and adjacent to the locking slot(s) 106. The optional configuration and function of the guiding protrusion 108 will be further described below.

Figure 2B:
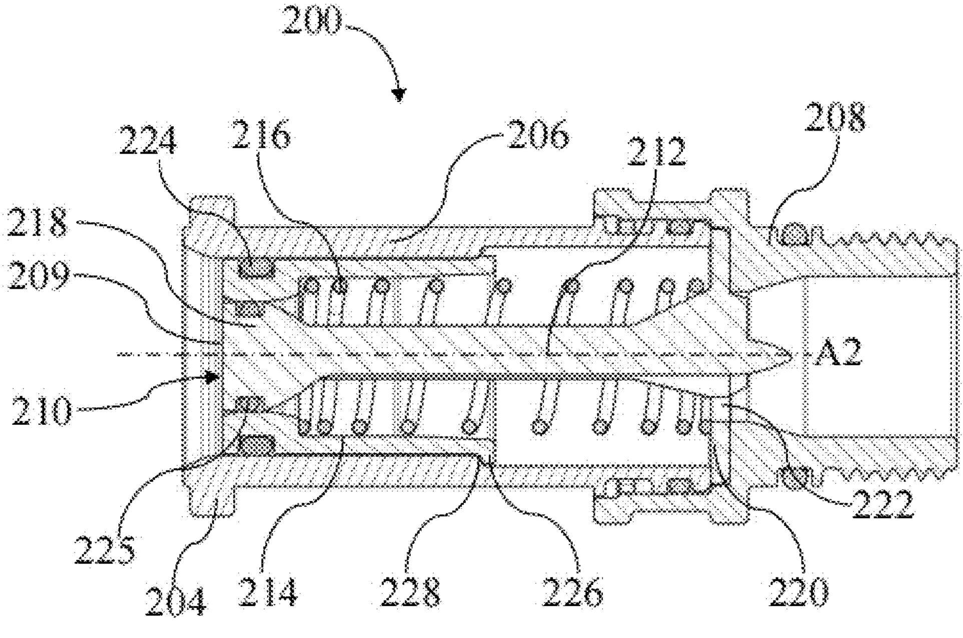

As shown in FIG. 2B, the second connector body 202 of the second connector 200 may include a first portion 206 and a second portion 208. In the first embodiment, both the first portion 206 and the second portion 208 may be substantially tubular. The first portion 206 defines a second axial direction A2, and at least part of the first portion 206 is received in and fixed to the second portion 208. One end of the first portion 206 defines an opening 209 allowing the first connector body 102 of the first connector 100 to insert into and includes the locking protrusions 204. The other end of the first portion 206 is fixed to the second portion 208. The first portion 206 and the second portion 208 may be fixed to each other by interference fit, snap fit, welding or any combination thereof. One end of the second portion 208 receives the first portion 206, and the other end of the second portion 208 is provided with external thread for fixing the second connector 200 to a device using the second connector 200.

The second connector 200 may further include a valve assembly 210. The valve assembly 210 is arranged in the first portion 206 of the second connector body 202 and configured for controlling the opening and closing of the flow path of the second connector 200. In the first embodiment, the valve assembly 210 may include a valve stem 212, a sliding sleeve 214 and an elastic element 216. The valve stem 212 may be positioned in the first portion 206 of the second connector body 202 in the second axial direction A2. The valve stem 212 may include a valve stem head 218 and a valve stem base 220 at two ends thereof. The valve stem base 220 includes through holes 222 penetrating through the valve stem base for fluid to flow therethrough.

The sliding sleeve 214 may be located in the first portion 206 and sleeved outside the valve stem 212, and be slidable between a second closed position and a second open position along the second axial direction A2. When the sliding sleeve 214 is in the second closed position, the sliding sleeve 214 blocks an annular gap between the first portion 206 and the valve stem head 218 to close the flow path of the second connector 200, and when the sliding sleeve 214 is in the second open position, the sliding sleeve 214 is moved away from the annular gap to open the flow path of the second connector 200. A sealing member 224 is provided between the outer periphery of the sliding sleeve 214 and the inner periphery of the first portion 206. A sealing member 225 is provided between the inner periphery of the sliding sleeve 214 and the outer periphery of the valve stem head 218.

In the first embodiment, two ends of the elastic element 216 may respectively abut against the sliding sleeve 214 and the valve stem base 220 to bias the sliding sleeve 214 toward the second closed position. The elastic element 216 may be in the form of a coil spring. The outer periphery of the sliding sleeve 214 may be provided with a limiting protrusion 226. The inner periphery of the first portion 206 is provided with a limiting surface 228. The limiting protrusion 226 and the limiting surface 228 may abut against each other to limit the sliding sleeve 214 in the second closed position.

When the sliding sleeve 214 is biased in the second closed position by the elastic element 216, the sliding sleeve 214 cooperates with the sealing members 224 and 225 to block the annular gap between the first portion 206 and the valve stem head 218, so that the flow path of the second connector 200 is closed. When the sliding sleeve 214 is pushed by an external force along the second axial direction A2, the sliding sleeve 214 can move away from the annular gap to the second open position against the elastic force of the elastic element 216, so that the flow path of the second connector 200 is opened.

Hereinafter, the process of connecting the first connector 100 with the second connector 200 of the connector assembly 10 according to the first embodiment of the present application will be described with reference to FIGS. 4A to 8B.

Figure 4A:
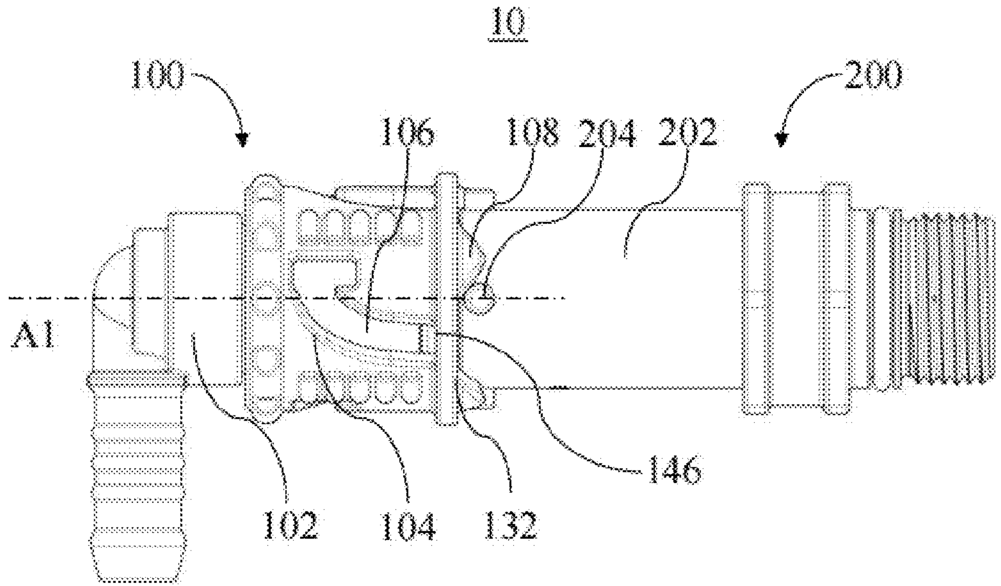
FIG. 4A and FIG. 4B are side and cross-sectional views, respectively, of the first connector and the second connector of the connector assembly according to the first embodiment of the present application, when the first connector and the second connector are in initial contact with each other during the connection thereof with each locking protrusion of the second connector abutting against a corresponding guiding protrusion of the first connector.
Figure 4B:
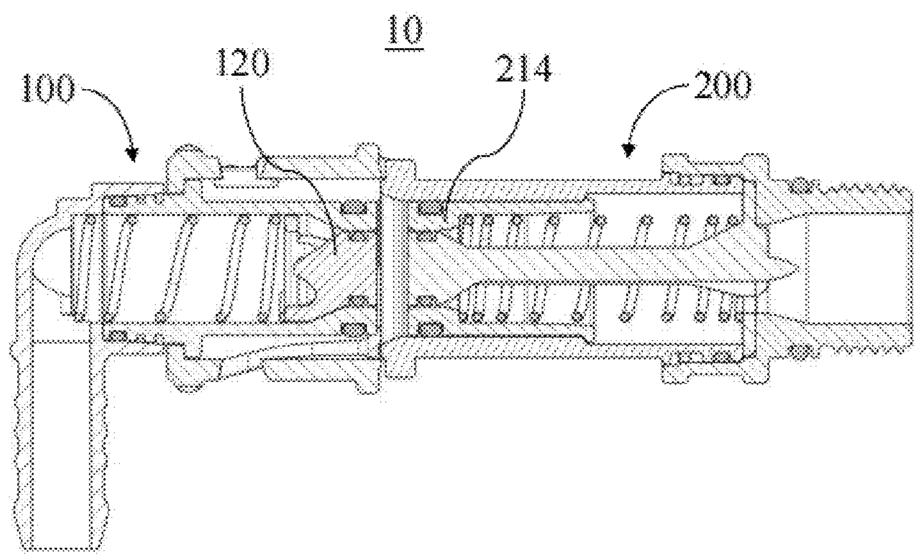

With reference to FIGS. 4A and 4B, during the connection of the second connector 200 with the first connector 100, it is required to insert the second connector body 202 between the first connector body 102 and the locking sleeve 104 in the first axial direction A1, which can be achieved, for example, by pushing the first connector 100 toward the second connector 200 or pushing the second connector 200 toward the first connector 100. In this process, the second connector body 202 firstly approaches the first axial end 132 of the locking sleeve 104.

If the locking protrusions 204 on the second connector body 202 are aligned with the inlet ends 146 of the locking slots 106 on the locking sleeve 104, the locking protrusions 204 of the second connector body 202 can smoothly enter the locking slots 106 of the locking sleeve 104.

If the locking protrusions 204 on the second connector body 202 are not aligned with the inlet ends 146 of the locking slots 106 on the locking sleeve 104 (for example, as shown in FIGS. 4A and 4B), the locking protrusions 204 will press against the guiding protrusions 108, and as the second connector body 202 is further inserted in the first axial direction A1, the locking protrusions 204 will push the locking sleeve 104 to rotate, so that the locking protrusions 204 can move along the guiding protrusions 108 until the locking protrusions 204 move into the locking slots 106 of the locking sleeve 104. In the state shown in FIGS. 4A and 4B, the valve core 120 of the first connector 100 is in the first closed position, and the sliding sleeve 214 of the second connector 200 is in the second closed position.

Figures 5A, 5B:
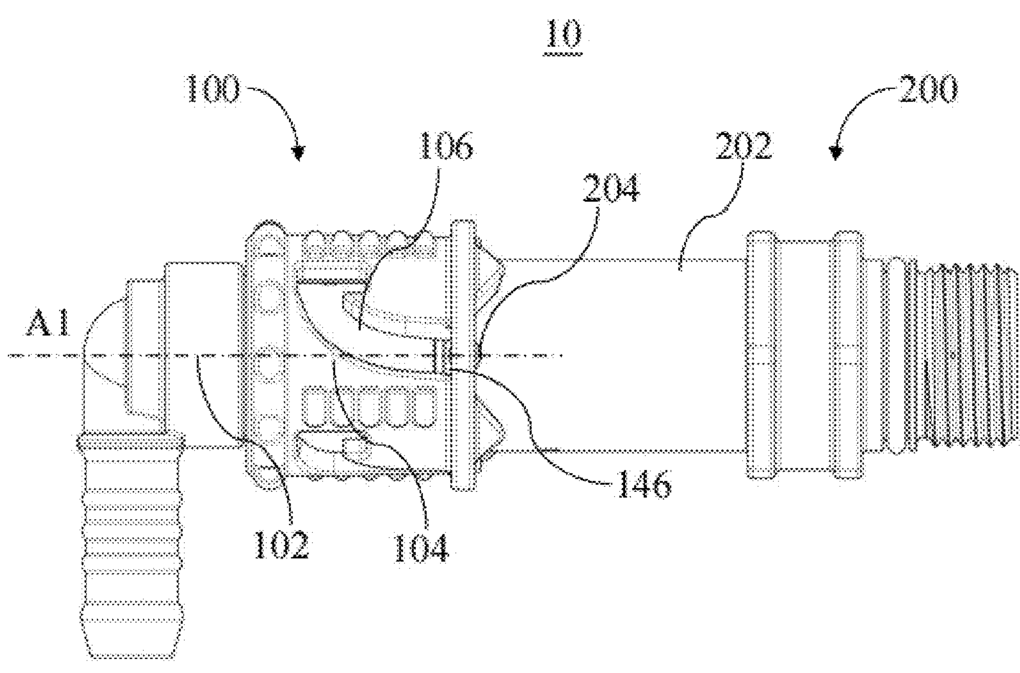
FIGS. 5A and 5B are side and cross-sectional views, respectively, of the first connector and the second connector of the connector assembly according to the first embodiment of the present application, when each locking protrusion just reaches an inlet end of a guiding segment of a corresponding locking slot during the connection of the first connector and the second connector.

In FIGS. 5A and 5B, the locking protrusions 204 have reached the inlet ends 146 of the locking slots 106 of the locking sleeve 104. At the same time, the first section 112 of the first connector 100 initially contacts with the sliding sleeve 214 of the second connector 200, and the valve core 120 of the first connector 100 initially contacts with the valve stem 212 of the second connector 200. At this time, the valve core 120 of the first connector 100 remains in the first closed position, and the sliding sleeve 214 of the second connector 200 remains in the second closed position.

Figure 6A:
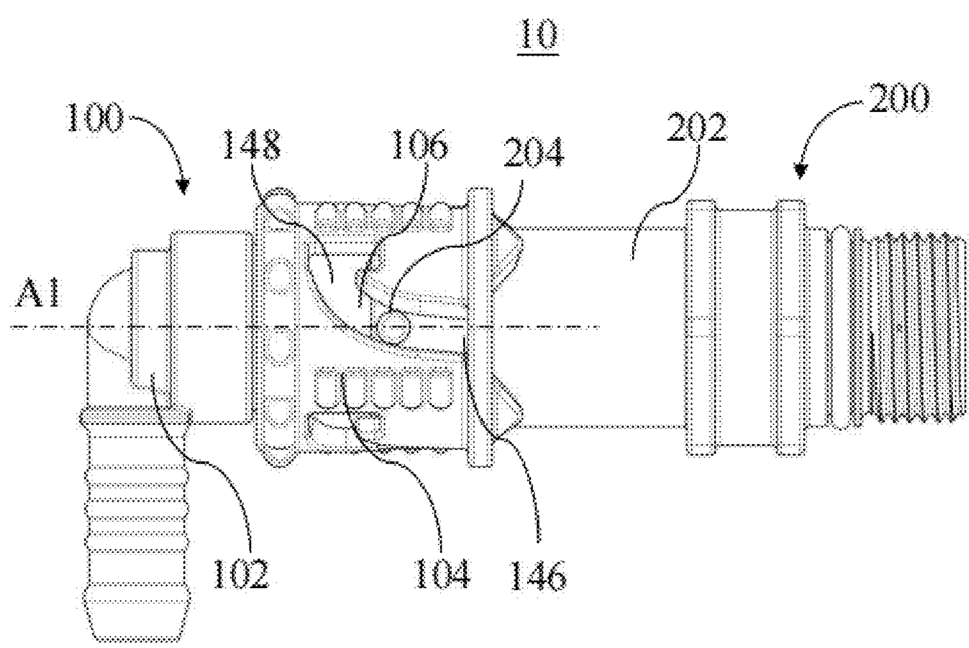
FIGS. 6A and 6B are side and cross-sectional views, respectively, of the first connector and the second connector of the connector assembly according to the first embodiment of the present application, when each locking protrusion further moves along a corresponding guiding segment during the connection of the first connector and the second connector.
Figure 6B:
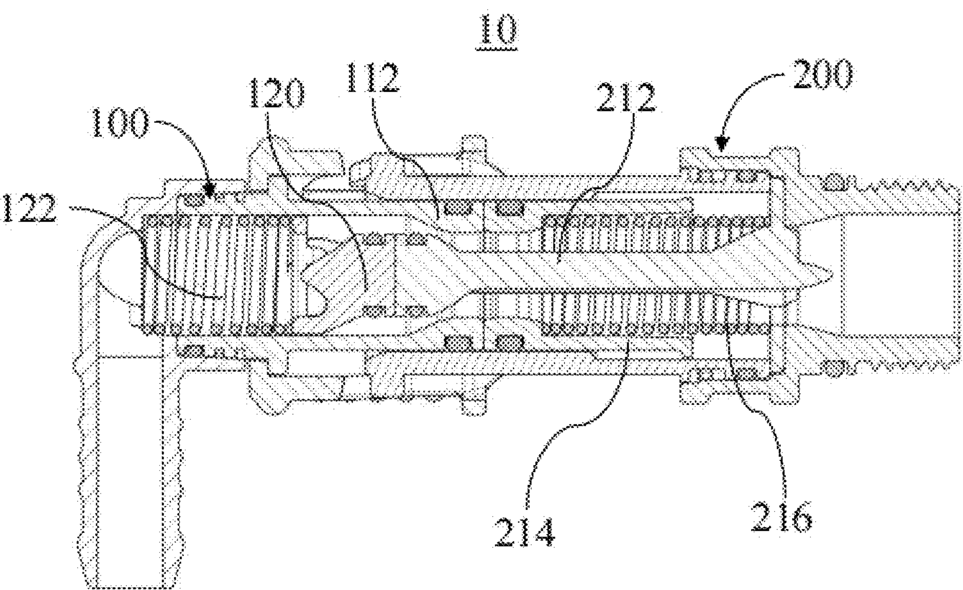

As shown in FIGS. 6A and 6B, as the second connector body 202 is further inserted, the locking protrusions 204 push against the side walls of the locking slots 106 and drive the locking sleeve 104 to rotate, so that the locking protrusions 204 move along the locking slots 106 toward the outlet ends 148. At the same time, the valve stem 212 of the second connector 200 pushes the valve core 120 from the first closed position toward the first open position against the elastic force of the elastic member 122 of the first connector 100, and the first section 112 of the first connector 100 pushes the sliding sleeve 214 from the second closed position toward the second open position against the elastic force of the elastic element 216 of the second connector 200.

Figure 7A:
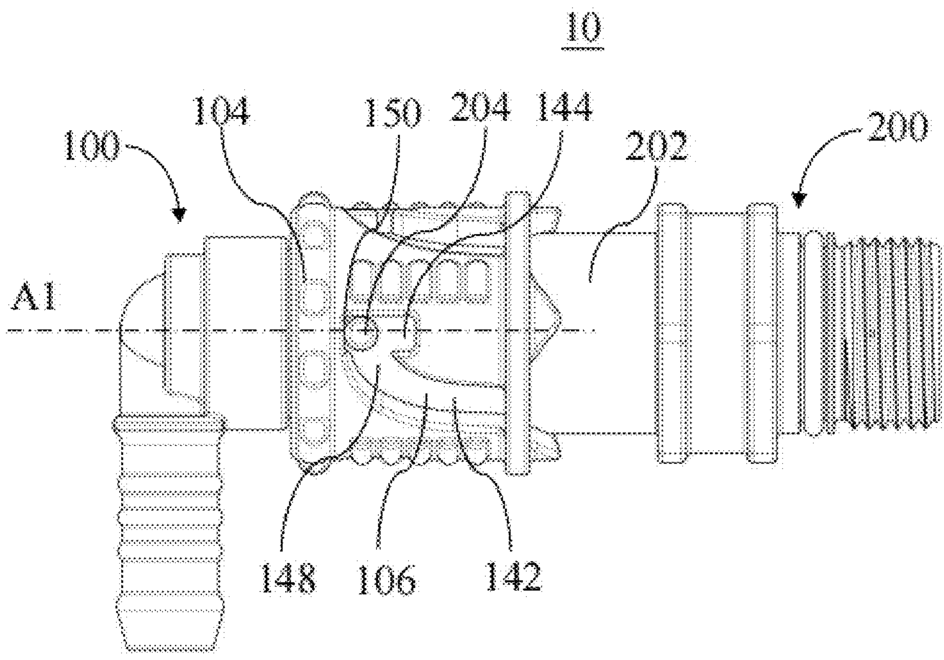
FIG. 7A and FIG. 7B are side and cross-sectional views, respectively, of the first connector and the second connector of the connector assembly according to the first embodiment of the present application, when each locking protrusion enters a positioning end of a locking segment of a corresponding locking slot during the connection of the first connector and the second connector.
Figure 7B:
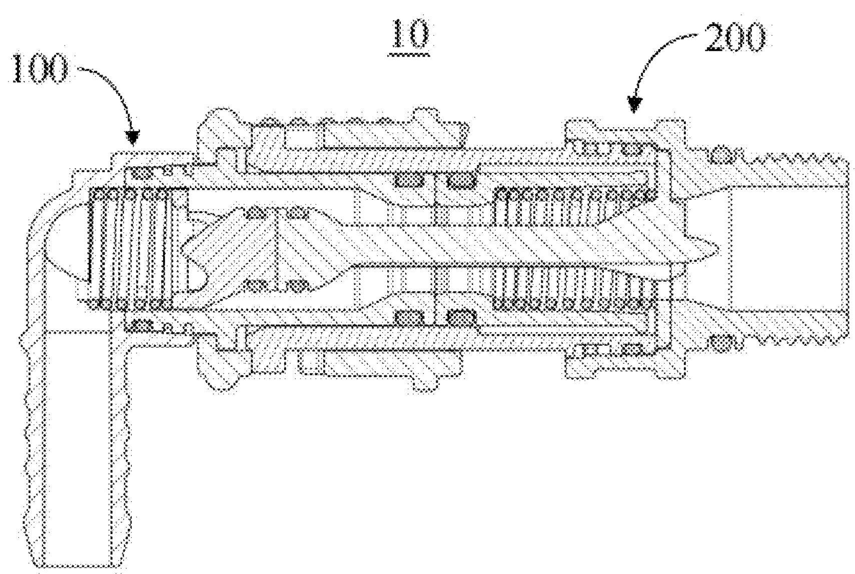

Then, as shown in FIGS. 7A and 7B, the locking protrusions 204 enter the positioning ends 150 of the locking segments 144 from the outlet ends 148 of the guiding segments 142 of the locking slots 106. At this time, the second connector body 202 cannot be further inserted, and the external force applied on the first connector 100 and/or the second connector 200 can be released.

Figure 8A:
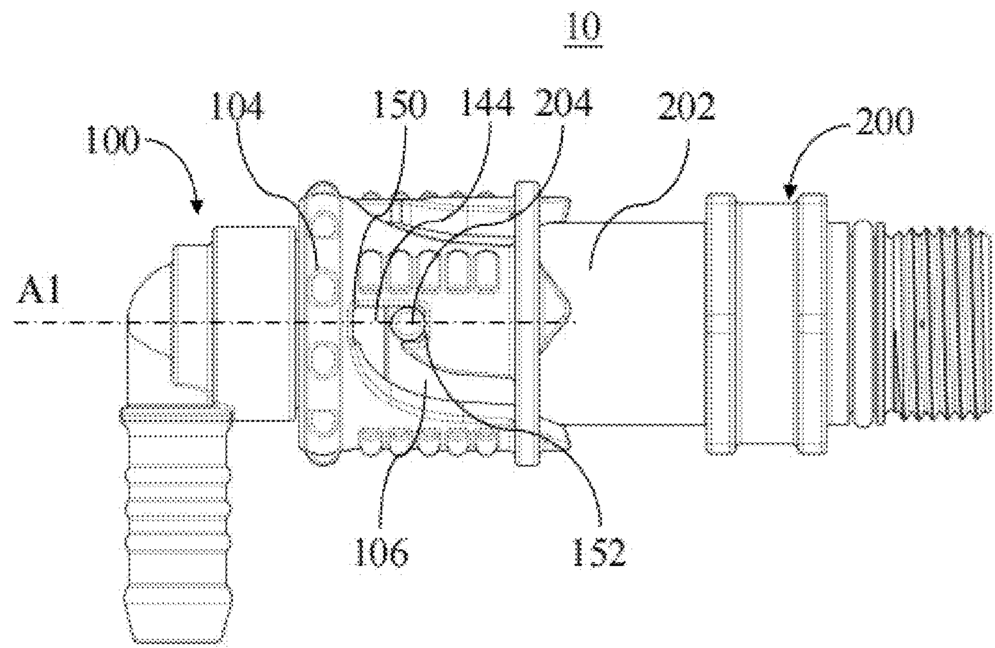
FIGS. 8A and 8B are side and cross-sectional views, respectively, of the first connector and the second connector of the connector assembly according to the first embodiment of the present application, when the connection of the first connector and the second connector is completed with each locking protrusion engaging with a locking end of a corresponding locking segment.
Figure 8B:
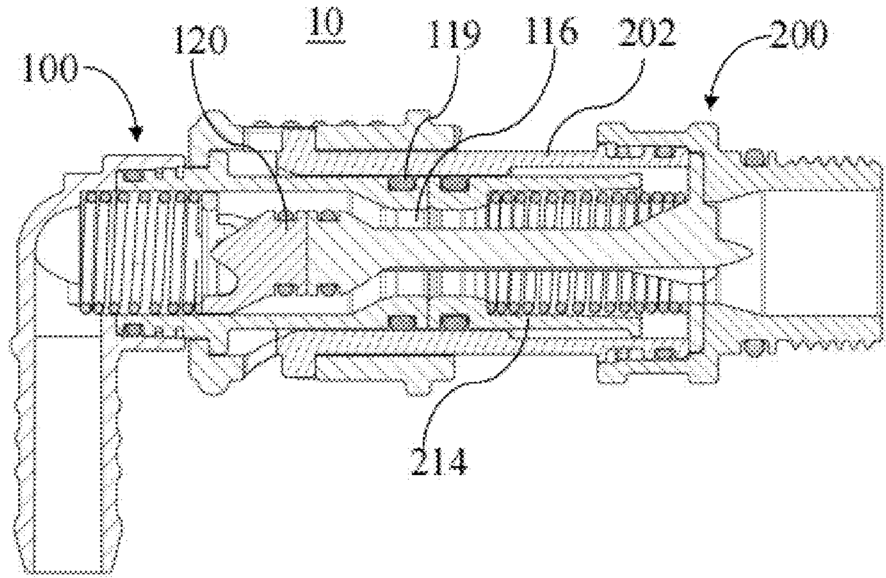

Then, as shown in FIGS. 8A and 8B, the first connector 100 and the second connector 200 tend to move away from each other under the action of the elastic forces of the elastic member 122 and the elastic element 216, so that the locking protrusions 204 of the second connector 200 move in the first axial direction A1 from the positioning ends 150 of the locking segments 144 to the locking ends 152 and engage with the locking ends 152, so as to prevent the second connector body 202 from disengaging from the locking sleeve 104, thereby completing the connection of the first connector 100 with the second connector 200. At this time, the valve core 120 of the first connector 100 is in the first open position, the sliding sleeve 214 of the second connector 200 is in the second open position, and the respective flow paths of the first connector 100 and the second connector 200 are open and in fluid communication with each other.

It is conceivable that, although in the first embodiment, the first connector 100 and the second connector 200 respectively have the elastic member 122 and the elastic element 216, it is also applicable that only one of the first connector 100 and the second connector 200 has an elastic component, as long as it can cause the first connector 100 and the second connector 200 to tend to move away from each other after the locking protrusions 204 enter the locking segments 144, so that the locking protrusions 204 can remain engaged with the locking segments 144.

As described above, for the connector assembly 10 according to the first embodiment, since guiding protrusions 108 are provided at the first axial end 132 of the locking sleeve 104, the locking protrusions 204 can be guided by the guiding protrusions 108 to enter the locking slots 106 and further engage with the locking slots 106 even if the locking protrusions 204 are not aligned with the inlet ends 146 of the locking slots 106 during the connection of the first connector 100 with the second connector 200, so that there is no need to intentionally manually adjust the circumferential relative position relationship between the second connector 200 and the locking sleeve 104 to align the locking protrusions 204 with the locking slots 106. In other words, the connector assembly 10 according to the first embodiment can achieve smooth connection and locking of the first connector 100 with the second connector 200 by means of blind-mating/alignment-free connection, thereby simplifying the connection process of the first connector 100 and the second connector 200. This blind-mating connection is easy to operate and requires less operation space, which is especially suitable for the application scenarios where the installation or assembly space is limited.

With reference back to FIGS. 3A and 3B, the guiding protrusion 108 of the locking sleeve 104 may include a guiding surface 154 for guiding the locking protrusion 204 into the locking slot 106. The guiding surface 154 may meet/adjoin the side wall of the locking slot 106 so as to smoothly guide the locking protrusion 204 into the locking slot 106. In the first embodiment, the guiding surface 154 meets the side wall 156 of the guiding segment 142 of the locking slot 106.

With reference to FIGS. 1, 3A and 3B, the locking sleeve 104 of the first connector 100 may include multiple locking slots 106 and multiple corresponding guiding protrusions 108. And accordingly, the second connector body 202 of the second connector 200 may also include multiple locking protrusions 204. In the first embodiment, the lock sleeve 104 includes four locking slots 106 and four guiding protrusions 108, and the second connector body 202 includes four locking protrusions 204. It is conceivable that the locking sleeve 104 may also include any other suitable number of locking slots 106 and guiding protrusions 108, and the second connector body 202 may include a corresponding number of locking protrusions 204.

The multiple locking slots 106 of the locking sleeve 104 of the first connector 100 may be spaced apart in the circumferential direction of the locking sleeve 104. Optionally, the locking sleeve 104 of the first connector 100 may include an even number of locking slots 106 to allow the locking sleeve 104 to be subjected to balanced forces and thus to rotate smoothly during the insertion of the second connector 200 into the first connector 100. Further, optionally, the even number of locking slots 106 are uniformly spaced apart in the circumferential direction of the locking sleeve 104.

With reference back to FIGS. 2A, 3A and 3B, each of the multiple guiding protrusions 108 may be arranged between the guiding segments 142 of two adjacent locking slots 106 in the circumferential direction of the locking sleeve 104. Each guiding protrusion 108 may include two guiding surfaces 154 each for guiding the locking protrusion 204 into a corresponding locking slot of two adjacent locking slots 106. In this way, the locking protrusion 204 can be guided into a corresponding locking slot 106 when contacting any one of the two guiding surfaces 154 of the guiding protrusion 108, facilitating smooth entry of the locking protrusion 204 into the locking slot 106.

In the first embodiment, the guiding protrusion 108 protrudes substantially parallel to the axial direction of the locking sleeve 104 or the first axial direction A1 of the first connector body 102. The guiding protrusion 108 tapers in a direction away from the locking sleeve 104 to form the two guiding surfaces 154 on two opposite sides of the guiding protrusion 108 in the circumferential direction of the locking sleeve 104.

In the first embodiment, each guiding surface 154 meets the side wall 156 of the guiding segment 142 of a corresponding locking slot 106 so as to smoothly guide the locking protrusion 204 into the locking slot 106. Further, in the first embodiment, the two guiding surfaces 154 of the guiding protrusion 108 may meet/adjoin each other. In other words, one side of each of the two guiding surfaces 154 meets/adjoins the other guiding surface, and the other side of each guiding surface meets/adjoins the side wall of a corresponding locking slot 106. Thus, in the process of connecting the first connector 100 with the second connector 200, in the case that the locking protrusions 204 of the second connector body 202 are not aligned with the inlet ends 146 of the locking slots 106 of the locking sleeve 104, each locking protrusion 204 will press against one of the two guiding surfaces 154 of a corresponding guiding protrusion 108 and be further guided into a corresponding locking slot 106, regardless of the circumferential relative position relationship between the second connector body 202 and the locking sleeve 104. This further facilitates the blind-mating connection of the first connector 100 with the second connector 200.

Each guiding surface 154 may be at an acute angle α with respect to a plane perpendicular to the axial direction of the locking sleeve 104 or the first axial direction A1 of the first connector body 102. In some embodiments, the acute angle α ranges between 30° and 60°, so that the locking sleeve 104 can rotate more smoothly when its guiding surfaces 154 are pushed by the locking protrusions 204, thereby avoiding jamming when the locking sleeve 104 rotates and further facilitating smooth entry of the locking protrusions 204 into the locking slots 106 to achieve blind-mating connection. In the first embodiment, the guiding surface 154 is substantially in the form of an inclined surface. It is conceivable that the guiding surface 154 may be in the form of a curved surface.

As shown in FIGS. 3A and 3B, the locking sleeve 104 may further include an extending portion 158. The extending portion 158 may be arranged on the outer side of the tubular wall 110 and integrally formed with the tubular wall 110. The extending portion 158 may be provided at or adjacent to the first axial end 132 of the tubular wall 110. The extending portion 158 may extend across the locking slot(s) 106 (in particular the guiding segment(s) 142) and/or across gap(s) between adjacent guiding protrusions 108. As shown in the figures, since the tubular wall 110 of the locking sleeve 104 is provided with the locking slots 106, the tubular wall 110 of the locking sleeve 104 is divided into multiple divisions by the locking slots 106. The extending portion 158 as described above may indirectly connect the divisions adjacent to the locking slot(s) 106 together and/or indirectly connect adjacent guiding protrusions 108 together. This can avoid the divisions or the guiding protrusion 108 from deforming inwardly during the injection molding of the locking sleeve 104. Also, this may increase the pulling force that the locking sleeve 104 can withstand after the first connector 100 and the second connector 200 are connected to each other, so as to avoid the damage of the locking sleeve 104 and thus connection failure. Such pulling force is applied to the locking sleeve 104 by the locking protrusions 204 of the second connector 200, for example, due to a tendency of the first connector 100 and the second connector 200 to move away from each other under the elastic forces of the elastic member 122 and the elastic element 216.

In some embodiments, as shown in FIGS. 3A and 3B, the extending portion 158 may extend along the entire circumference of the locking sleeve 104 to provide a good reinforcing effect. It is conceivable that the extending portion 158 may extend not along the entire circumference of the locking sleeve 104, but include multiple extending sections spaced apart from each other, with each extending section extending at least across a corresponding locking slot 106 or a corresponding gap between two adjacent guiding protrusions 108, so that the multiple divisions or guiding protrusions 108 are connected together by the multiple extending sections.

FIGS. 9 to 19B show a connector assembly 10 and its components according to the second embodiment of the present application. The connector assembly according to the second embodiment is similar to the connector assembly according to the first embodiment, and the differences therebetween mainly lie in that the constructions of the first connector body and the second connector body of the connector assembly according to the second embodiment are different from those of the connector assembly according to the first embodiment. The following description mainly focuses on the differences between the two embodiments.

Figure 9:
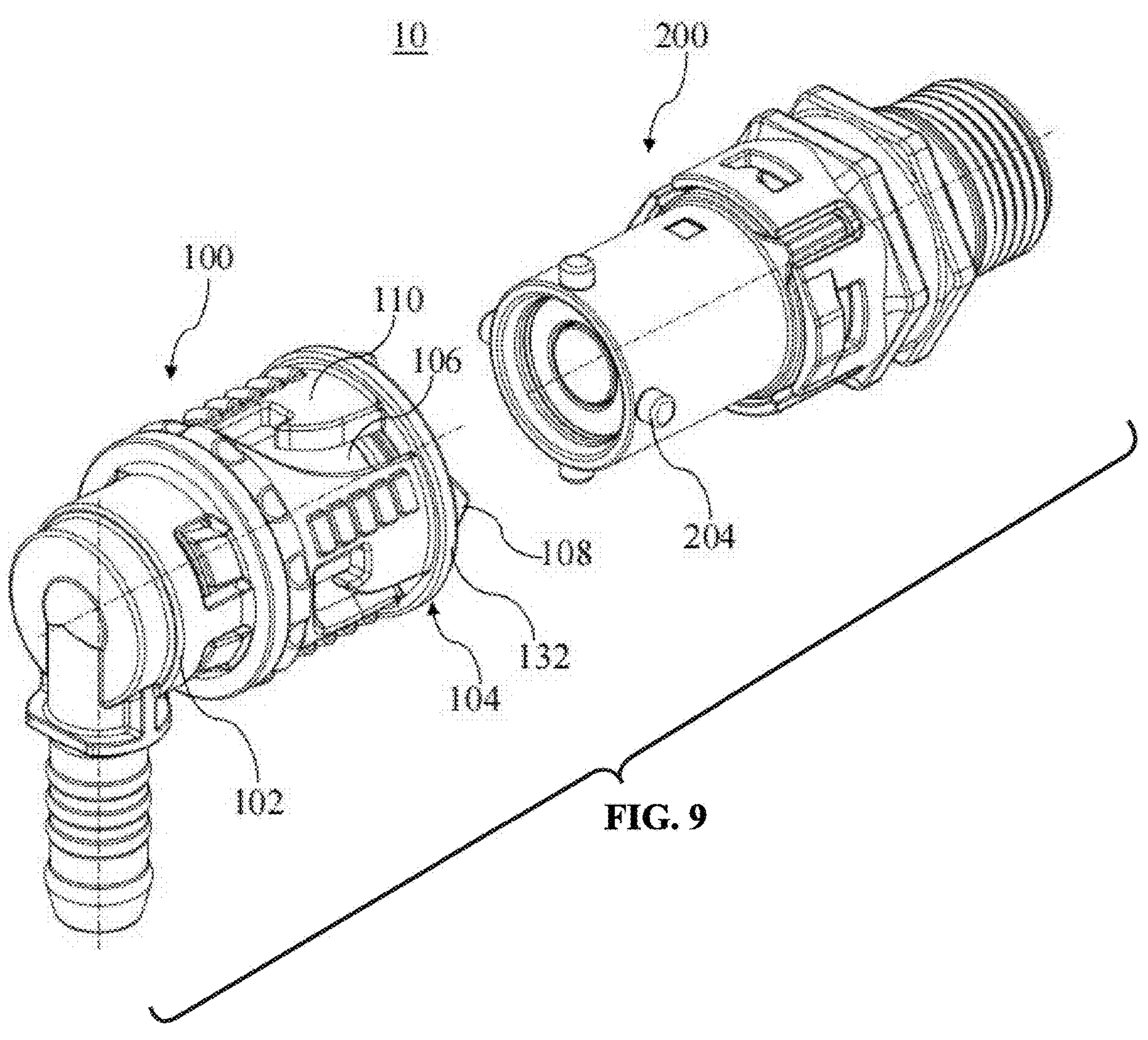
FIG. 9 is a perspective view of a connector assembly according to a second embodiment of the present application, wherein first and second connectors of the connector assembly are not connected to each other.

Referring to FIG. 9, the connector assembly 10 may include a first connector 100 and a second connector 200 for being connected with the first connector 100.

Figure 10:
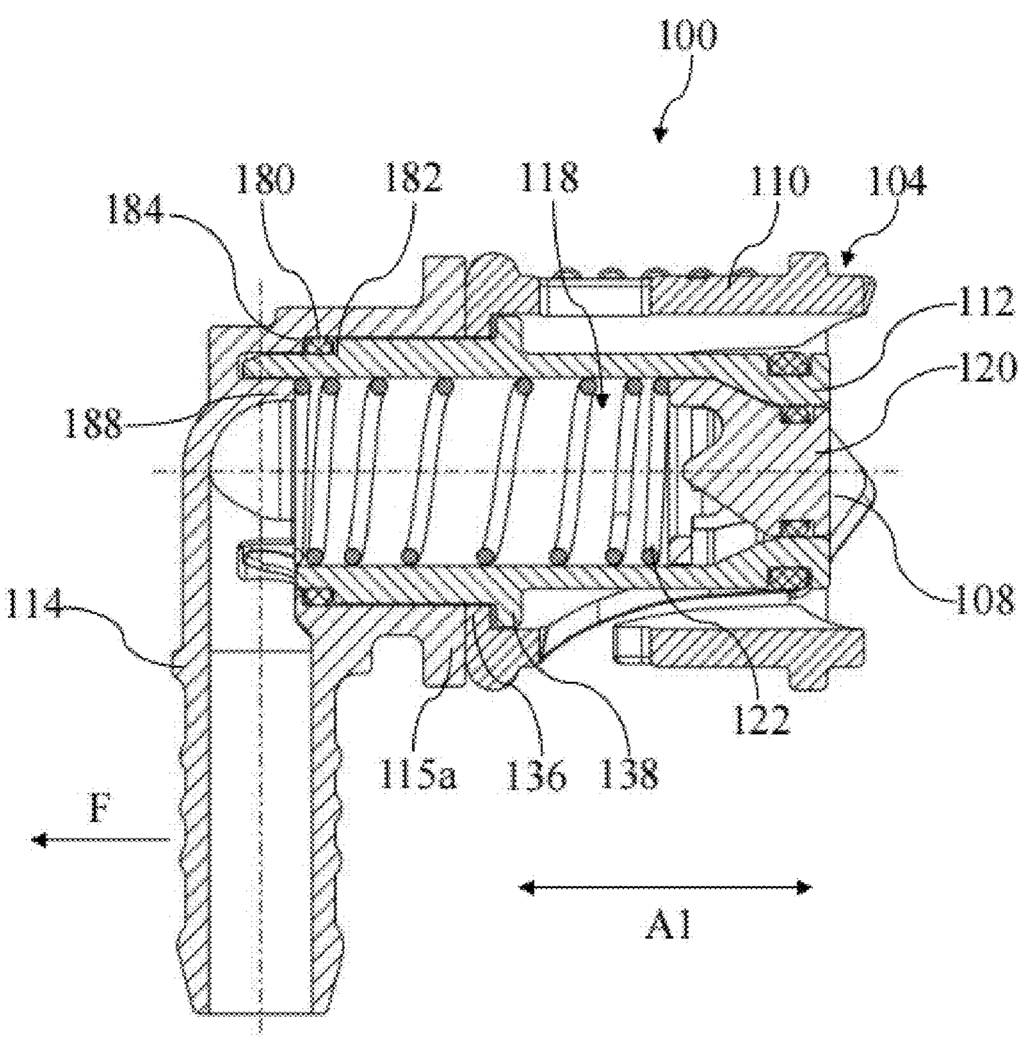
FIG. 10 is a cross-sectional view of the first connector of the connector assembly according to the second embodiment of the present application.

With reference to FIGS. 9 and 10, the first connector 100 may include a first connector body 102 defining a flow path. The first connector body 102 may include a tubular first section 112 and a tubular second section 114. The first section 112 may be in the form of a substantially straight tube and defines a first axial direction A1. The second section 114 may be in the form of an elbow tube and have a bending angle of about 90°. The first section 112 may be at least partially received in and fixed/connected to the second section 114. It is conceivable that, in some embodiments, the second section may have any other suitable bending angle, or the second section may be in the form of a substantially straight tube. The first section 112 and the second section 114 may be formed by injection molding. The first section 112 and the second section 114 may be made of a flame retardant material such that the first connector 100 may have a certain degree of flame retardance, and thus be suitable for application scenarios (such as for electric vehicles) with flame retardance requirements.

Figure 11:
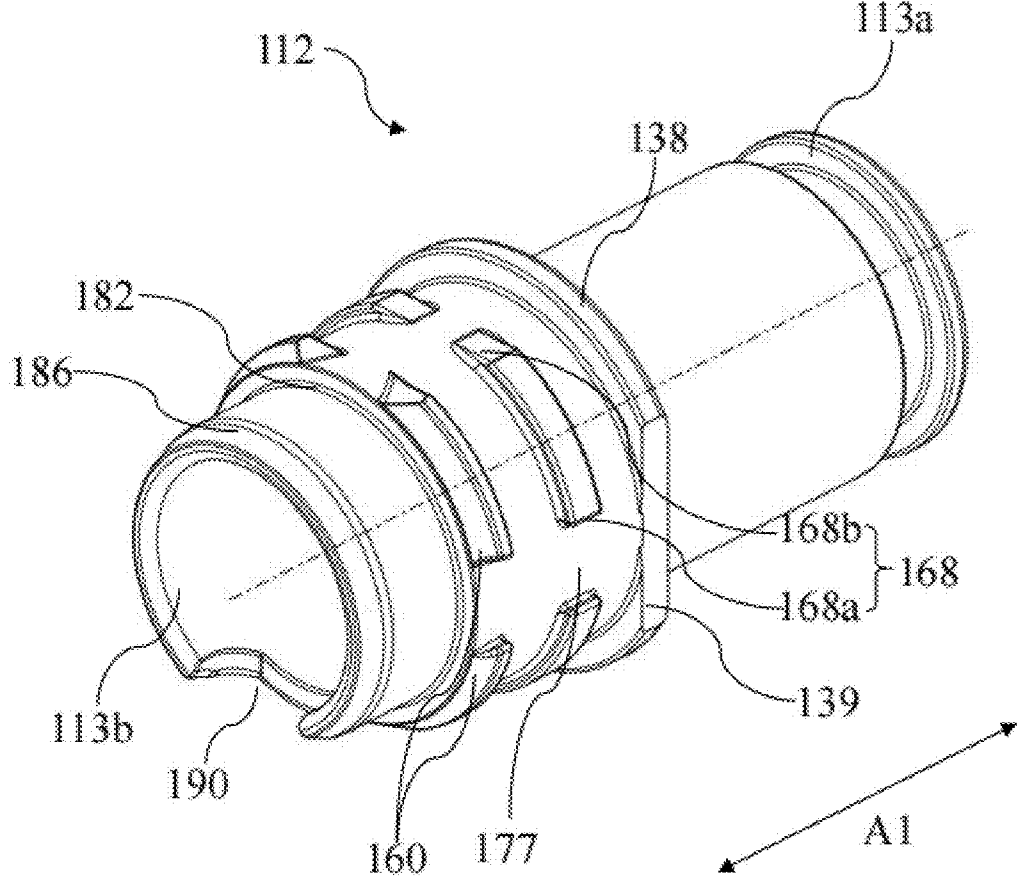
FIG. 11 is a perspective view of a first section of a first connector body of the first connector of the connector assembly according to the second embodiment of the present application.
Figures 12A, 12B:
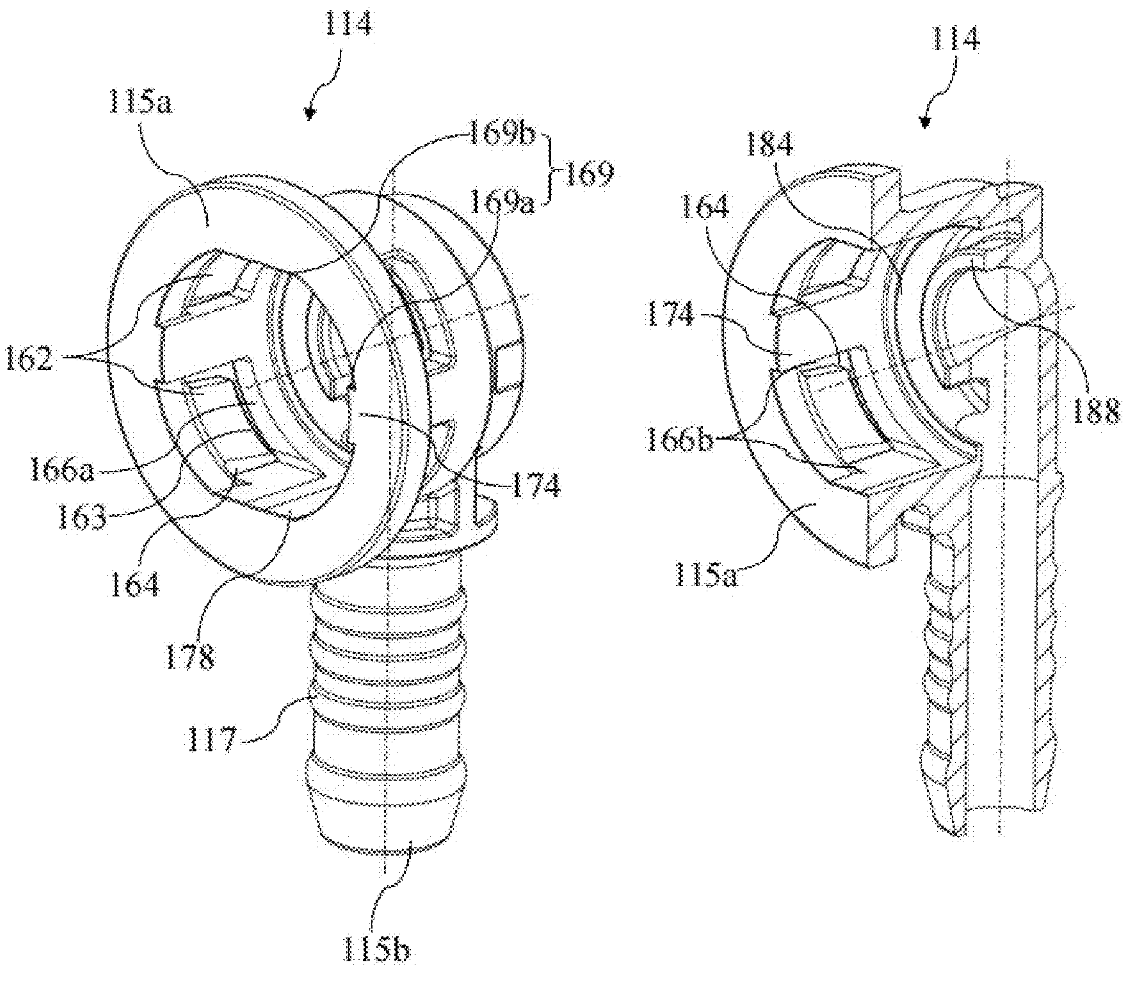
FIGS. 12A and 12B are perspective and cross-sectional views, respectively, of a second section of the first connector body of the first connector of the connector assembly according to the second embodiment of the present application.
Figure 13:
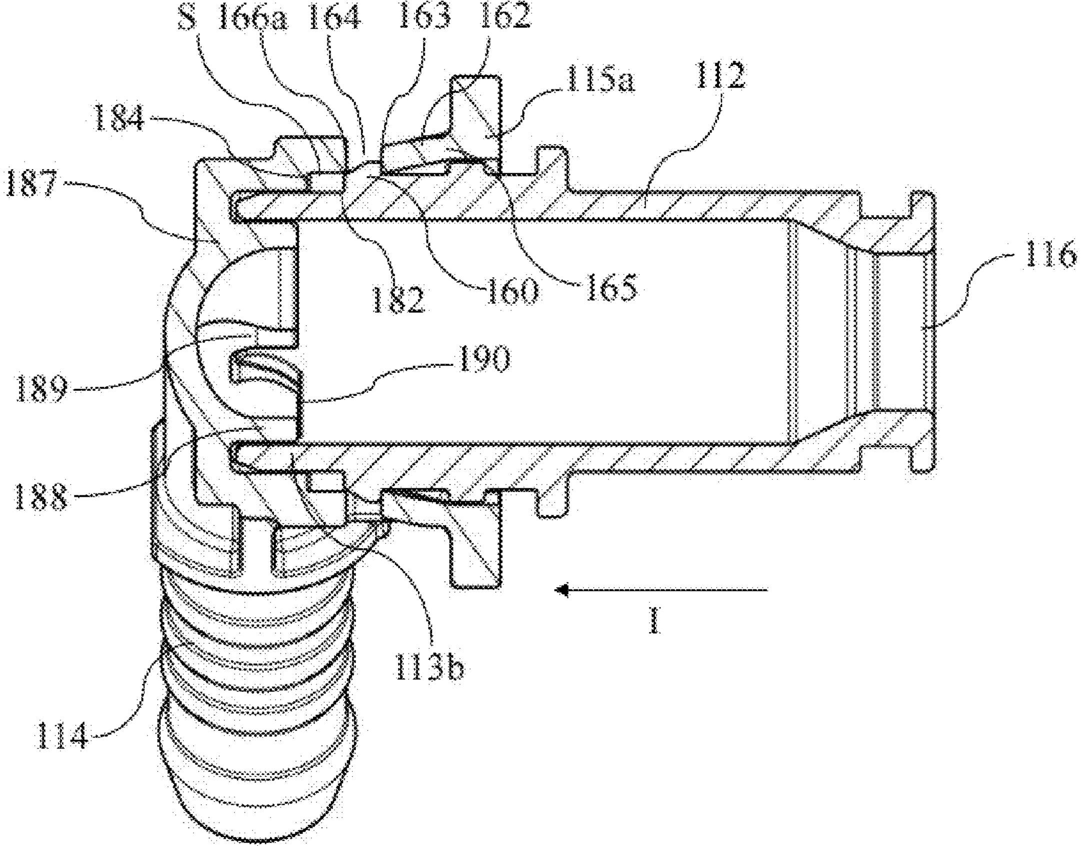
FIG. 13 is a cross-sectional view of the first and second sections of the first connector body of the connector assembly according to the second embodiment of the present application, when the first section and the second section are connected to each other.

With reference to FIGS. 11 to 13, the first section 112 may have a first axial end 113*a* defining a port 116 (see FIG. 13) and a second axial end 113*b* adapted to be inserted/received in the second section 114. The second section 114 may include a receiving end 115*a* through which the first section 112 is inserted into the second section 114 and a connecting end 115*b* connected to a fluid pipeline/member (not shown) for fluid communication with the fluid pipeline/member.

In the second embodiment, the connecting end 115*b* of the second section 114 may include multiple circumferential annular flanges 117 arranged on its outer periphery, so that a hose, for example, can remain connected to the second section 114 through the multiple annular flanges 117. It is conceivable that, in other embodiments, the connecting end of the second section may have other configurations for connection with other kinds of fluid pipelines/members.

The first section 112 may be at least partially inserted into the second section 114 via the receiving end 115*a* in an insertion direction I parallel to the axial direction A1 of the first section 112, and be connected/fixed to the second section 114 in a detachable manner (for example, by snap fit shown in FIGS. 11 to 13). Since the first section 112 and the second section 114 are detachably connected/fixed to each other, the first connector is allowed to be connected to fluid pipelines/members of different constructions by replacing the second section with another one of a different construction, thereby expanding the application of the connector assembly.

With further reference to FIGS. 11 to 13, the first section 112 may include multiple abutting projections 160 spaced circumferentially apart from each other. The second section 114 may include multiple abutting cantilevers 162 spaced circumferentially apart from each other. The number of the abutting projections 160 may be equal to the number of the abutting cantilevers 162. When the first section 112 is inserted in place within the second section 114, each abutting projection 160 can mechanically interfere with/abut against a free end 163 of a corresponding abutting cantilever 162, to limit movement of the first section 112 relative to the second section 114 in a direction opposite to the insertion direction I.

In the second embodiment, the second section 114 may include multiple windows 164 that penetrate through the circumferential wall of the second section 114 and are spaced circumferentially apart from each other. The number of the windows 164 may be equal to the number of the abutting cantilevers 162. Each abutting cantilever 162 may be located in a corresponding window 164. In the second embodiment, each window 164 may include a first edge **166*a* facing the free end 163 of a corresponding abutting cantilever 162 and two second edges 166*b* located on two opposite sides of the first edge 166*a*. The first edge 166*a* may extend substantially circumferentially and the two second edges 166*b* may extend substantially axially. When the first section 112 is inserted in place within the second section 114, each abutting projection 160 can mechanically interfere with/abut against the first edge 166*a* of a corresponding window 164, to limit movement of the first section 112 relative to the second section 114** in the insertion direction I.

In the second embodiment, the first section 112 includes four abutting projections 160, and the second section 114 includes four abutting cantilevers 162. It is conceivable that, in other embodiments, the first section may include other suitable number of abutting projections, and the second section may include other suitable number of abutting cantilevers.

In the process of inserting the first section 112 into the second section 114, each abutting projection 160 on the first section 112 pushes against a corresponding abutting cantilever 162 to cause the abutting cantilever 162 to elastically deform radially outward until the abutting projection 160 moves into a corresponding window 164 and no longer pushes against the abutting cantilever 162. Then, the abutting cantilever 162 recovers from the deformation and the abutting projection 160 is positioned between the free end 163 of the abutting cantilever 162 and the first edge **166*a* of the corresponding window 164. In this case, the axial movement of the first section 112 relative to the second section 114 can be limited by mechanical interference/abutment between the abutting projections 160 and the free ends 163 of the abutting cantilevers 162 and by mechanical interference/abutment between the abutting projections 160 and the first edges 166*a* of the corresponding windows 164. In addition, when the first section 112 is inserted in place within the second section 114, each abutting projection 160 can mechanically interfere with/abut against the second edges 166*b* of a corresponding window 164, to limit the circumferential movement/rotation of the first section 112 relative to the second section 114**.

It is conceivable that the above-described method/configuration for connecting/fixing the first section to the second section is only an example and not a limitation, and the first section and the second section may be connected/fixed to each other by other suitable means or structures.

In the second embodiment, each abutting cantilever 162 of the second section 114 may extend from the receiving end **115*a* toward an interior of the second section 114 to form an acute angle with the insertion direction I. By appropriately designing the value of the acute angle, the stress concentration at the root 165 of the abutting cantilever 162 can be reduced during the process of inserting the first section 112 into the second section 114, and it can be ensured that the abutting cantilever 162 has a sufficient contact/abutting area with the abutting projection 160 when the first section 112 is inserted in place within the second section 114, thereby improving the connection reliability of the first section 112 and the second section 114**.

In the second embodiment, each abutting cantilever 162 may have a substantially uniform thickness. This is particularly advantageous when the second section 114 is manufactured by injection molding. Specifically, the uniform thickness of the abutting cantilever 162 allows melt plastic to uniformly fill the mold, cool and contract during the injection molding, so that the abutting cantilevers 162 of the formed second section 114 have high dimensional accuracy. This help to ensure that the abutting cantilevers 162 have sufficient contact/abutting area with the abutting projections 160 when the first section 112 is inserted in place within the second section 114, thereby improving the connection reliability of the first section 112 and the second section 114.

With reference to FIGS. 10 to 12B and FIGS. 14A and 14B, the first section 112 may include at least one outer bearing surface 168 arranged on the outer side of the first section 112, and the second section 114 may include at least one inner bearing surface 169 arranged on the inner side of the second section 114. Each outer bearing surface 168 is adapted to abut/contact/fit with a corresponding inner bearing surface 169 to bear a lateral load substantially perpendicular to the axial direction A1 of the first section 112 at a joint between the first section 112 and the second section 114, and in particular to bear a lateral load substantially perpendicular to the axial direction A1 of the first section 112 at a joint between the first section 112 and the second section 114 when the first connector 100 is subjected to a lateral force. The at least one outer bearing surface 168 and the at least one inner bearing surface 169 extend nonparallel to the direction of the lateral load.

Figure 14A:
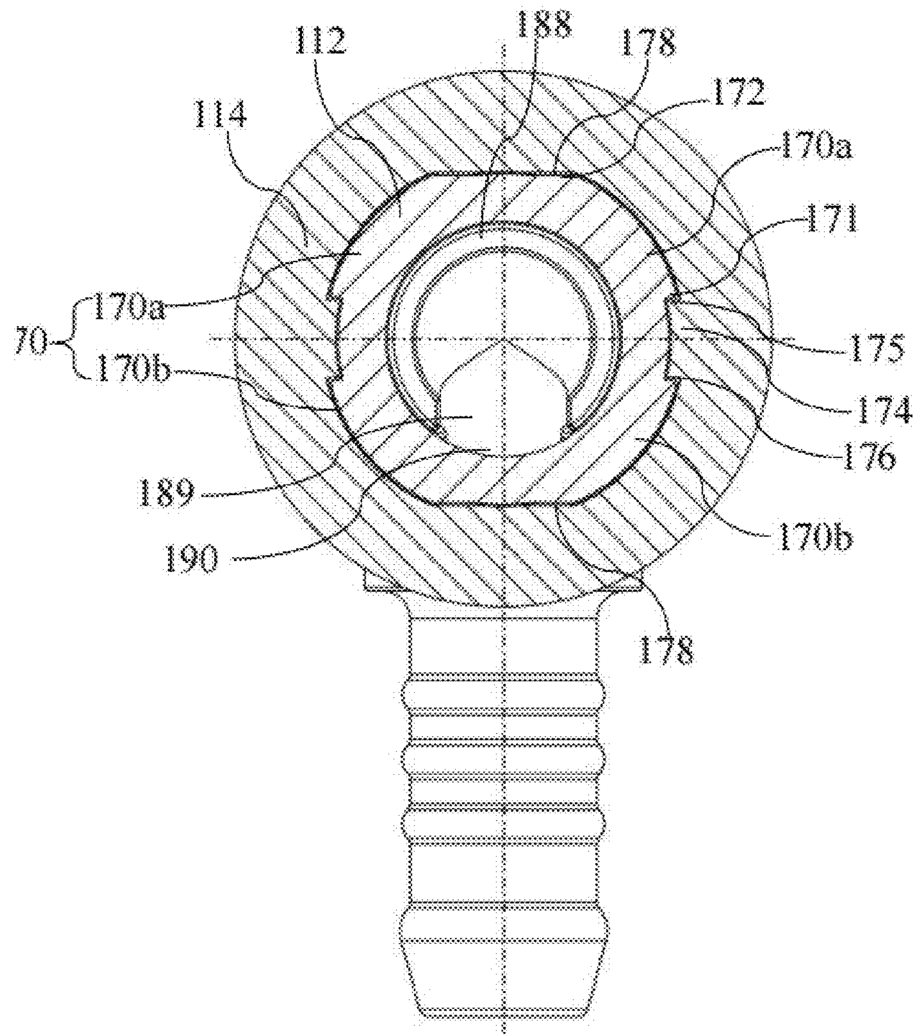
FIG. 14A is another cross-sectional view of the first and second sections of the first connector body of the connector assembly according to the second embodiment of the present application, when the first section and the second section are connected to each other.
Figure 14B:
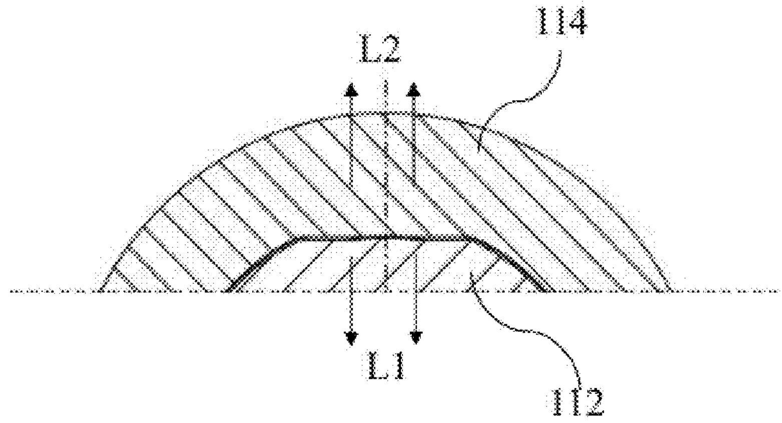
FIG. 14B is a partly enlarged view of FIG. 14A.

The fluid pipeline/member connected to the second section 114 of the first connector 100 may shake or swing due to external factors such as vibrations, bumps, etc., or may be pulled by a maintenance personnel during maintenance, and thus may apply to the second section 114 lateral force (for example, the lateral force F shown in FIG. 10) in a direction, for example, substantially perpendicular to the central axis of the first section 112 and/or the central axis of the second section 114. Such lateral force causes the portion of the second section 114 for receiving the first section 112 to have a tendency to tilt with respect to the first section 112 (in other words, the central axis of the portion of the second section 114 for receiving the first section 112 has a tendency to tilt with respect to the central axis of the first section 112), and causes the joint between the first section 112 and the second section 114 to be subjected to lateral load substantially perpendicular to the axial direction A1 of the first section 112 (for example, the lateral load L1 on the first section 112 and the lateral load L2 on the second section 114 as shown in FIG. 14B). The above-described abutment/contact/fit of the outer bearing surface 168 with the corresponding inner bearing surface 169 can bear and share the lateral load, avoid stress concentration at the joint between the first section 112 and the second section 114, and thus avoid deformation of or damage to the first section 112 and/or the second section 114, and in particular, avoid deformation of or damage to the second section 114 provided with the windows 164.

It is conceivable that the directions of the lateral force and lateral load shown in FIGS. 10 and 14B are illustrative rather than restrictive. For example, the lateral load at the joint between the first section and the second section may be in other directions perpendicular to the axial direction of the first section, and the extension directions of the outer bearing surface and the inner bearing surface may be set according to the direction of the lateral load.

In the second embodiment, the at least one outer bearing surface 168 and the at least one inner bearing surface 169 are planar and extend substantially perpendicular to the directions of the lateral loads L1, L2 so as to more efficiently bear and share the lateral loads. It is conceivable that, in other embodiments, the outer bearing surface and the inner bearing surface may not be substantially perpendicular to the direction of the lateral load.

With further reference to FIGS. 10 to 12B and FIGS. 14A and 14B, the first section 112 may include at least one rib 170 arranged on its outer side. Each rib 170 may extend in the circumferential direction of the first section 112 and include a first end surface 171 and a second end surface 172 in the circumferential direction of the first section 112. The first end surface 171 and/or the second end surface 172 of the at least one rib 170 may form one or more of the at least one outer bearing surface 168.

The second section 114 may include at least one engaging protrusion 174 arranged on its inner side. The at least one outer bearing surface 168 may include at least one first outer bearing surface 168*a* formed by the first end surface 171 of the rib 170. The at least one inner bearing surface 169 may include at least one first inner bearing surface 169*a* formed by the surface of the engaging protrusion 174. Each first outer bearing surface 168*a* is adapted to abut/contact/fit with the corresponding first inner bearing surface 169*a* to bear and share the lateral load.

In the second embodiment, the at least one rib 170 may include a first rib 170*a* and a second rib 170*b* that are adjacent to each other and spaced apart from each other in the circumferential direction of the first section 112. The first outer bearing surface 168*a* formed by the first end surface 171 of the first rib 170*a* is adapted to abut/contact/fit with the first inner bearing surface 169*a* formed by a first side surface 175 of a corresponding engaging protrusion of the at least one engaging protrusion 174. The first outer bearing surface 168*a* formed by the first end surface 171 of the second rib 170*b* is adapted to abut/contact/fit with the first inner bearing surface 169*a* formed by a second side surface 176 of the corresponding engaging protrusion 174 opposite to the first side surface 175.

In the second embodiment, the second section 114 includes four ribs 170 spaced circumferentially apart from each other, that is, two first ribs 170*a* and two second ribs 170*b*. An engaging groove 177 is defined between each first rib 170*a* and an adjacent second rib 170*b*. Correspondingly, the second section 114 includes two engaging protrusions 174 arranged on its inner side. Each engaging groove 177 engages with a corresponding engaging protrusion 174 such that: the first outer bearing surface 168*a* formed by the first end surface 171 of the first rib 170*a* is adapted to abut/contact/fit with the first inner bearing surface 169*a* formed by the first side surface 175 of the corresponding engaging protrusion 174, and the first outer bearing surface 168*a* formed by the first end surface 171 of the second rib 170*b* is adapted to abut/contact/fit with the first inner bearing surface 169*a* formed by the second side surface 176 of the corresponding engaging protrusion 174.

In the second embodiment, the first end surface 171 of each rib 170 forms one first outer bearing surface 168*a* and extends substantially perpendicular to the direction of the lateral load, and the first side surface 175 and the second side surface 176 of each engaging protrusion 174 form two first inner bearing surfaces 169*a* and extend substantially perpendicular to the direction of the lateral load.

The at least one outer bearing surface 168 may further include at least one second outer bearing surface 168*b* formed by the second end surface 172 of the rib 170. The at least one inner bearing surface 169 may further include at least one second inner bearing surface 169*b* formed by a portion 178 of the inner surface of the second section 114. Each second outer bearing surface 168*b* is adapted to abut/contact/fit with a corresponding second inner bearing surface 169*b* to bear and share the lateral load. In the second embodiment, the second end surface 172 of each of the four ribs 170 forms one second outer bearing surface 168*b* and extends substantially perpendicular to the direction of the lateral load; and the inner surface of the second section 114 includes four planar portions 178 and these planar portions 178 extend substantially perpendicular to the direction of the lateral load.

In the second embodiment, the first end surface 171 and the second end surface 172 of each rib 170 form the outer bearing surfaces 168, and are parallel to each other so as to jointly bear and share the lateral load.

It is conceivable that, in other embodiments, only one of the first end surface and the second end surface of each rib forms the outer bearing surface. It is also conceivable that the number and arrangement of the ribs and engaging protrusions shown in the figures are illustrative only, other suitable number of ribs and engaging protrusions may be provided, and the ribs and engaging protrusions may be arranged/configured in other ways.

With reference to FIGS. 10 and 13, the first connector 100 may further include a sealing member 180 to achieve a sealing connection of the first section 112 with the second section 114. The first section 112 may have a first annular stepped portion 182 on its outer side, and the first annular stepped portion 182 may be arranged at/near the second axial end 113*b* of the first section 112. The second section 114 may have a second annular stepped portion 184 on its inner side, and the second annular stepped portion 184 is arranged to be further away from the receiving end 115*a* of the second section 114 than the window 164. The first annular stepped portion 182 and the second annular stepped portion 184 jointly define an accommodating space S for accommodating the sealing member 180 when the first section 112 is connected/fixed to the second section 114. During the assembly of the first section 112 and the second section 114, the sealing member 180 may be placed at the second annular stepped portion 184 of the second section 114, and then the first section 112 is inserted into the second section 114 to confine the sealing member 180 within the accommodating space S.

For a conventional configuration with an accommodating groove provided in the first section for accommodating the sealing member, during assembly, it is required to first place the sealing member in the accommodating groove in the first section and then insert the first section into the second section. However, during the insertion of the first section into the second section, the sealing member on the first section may be cut by the edges of the windows of the second section and thus damaged when moving across the windows, thereby causing seal failure. In contrast, the above-described configuration/method for positioning and mounting the sealing member according to the second embodiment of the present application can avoid damage to the sealing member due to cutting during assembly.

With reference to FIGS. 10, 11, 13 and 14A, the second axial end 113*b* of the first section 112 may further include an outer chamfer 186. During the assembly of the first section 112, the second section 114, and the sealing member 180, the sealing member 180 placed at the second annular stepped portion 184 of the second section 114 can be gradually compressed by the outer chamfer 186, so that the sealing member 180 can smoothly enter between the first section 112 and the second section 114.

The second section 114 may be provided with a seat 188 therein, and the seat 188 is located at a turning 187 of the second section 114 (the function of the seat 188 will be further described below). The seat 188 may be substantially arc-shaped and have a notch 189. When the first section 112 is connected/fixed to the second section 114, the second axial end 113*b* of the first section 112 is inserted into the interior of the second section 114, more particularly between the circumferential wall of the second section 114 and the seat 188, and located at the turning 187 of the second section 114. The circumferential wall of the first section 112 is provided with a communicating port 190 at the second axial end 113*b*. When the first section 112 is connected/fixed to the second section 114, the communicating port 190 of the first section 112 is substantially aligned with the notch 189 of the seat 188 of the second section 114, and the first section 112 and the second section 114 can be in fluid communication with each other via the notch 189 and the communicating port 190, which avoids a sudden decrease in the cross-sectional area of the flow path defined by the first connector body 102 at/near the turning 187 of the second section 114, and thus avoids a significant pressure drop when fluid flows through the first connector 100.

It is conceivable that the above structures of the first and second sections (including, but not limited to, ribs, engaging protrusions, abutting cantilevers, abutting projections, first annular stepped portion, second annular stepped portion, communicating port, etc.) may be used for various connectors having a two-part connector body in addition to the first connector as shown in the figures.

Figure 18A:
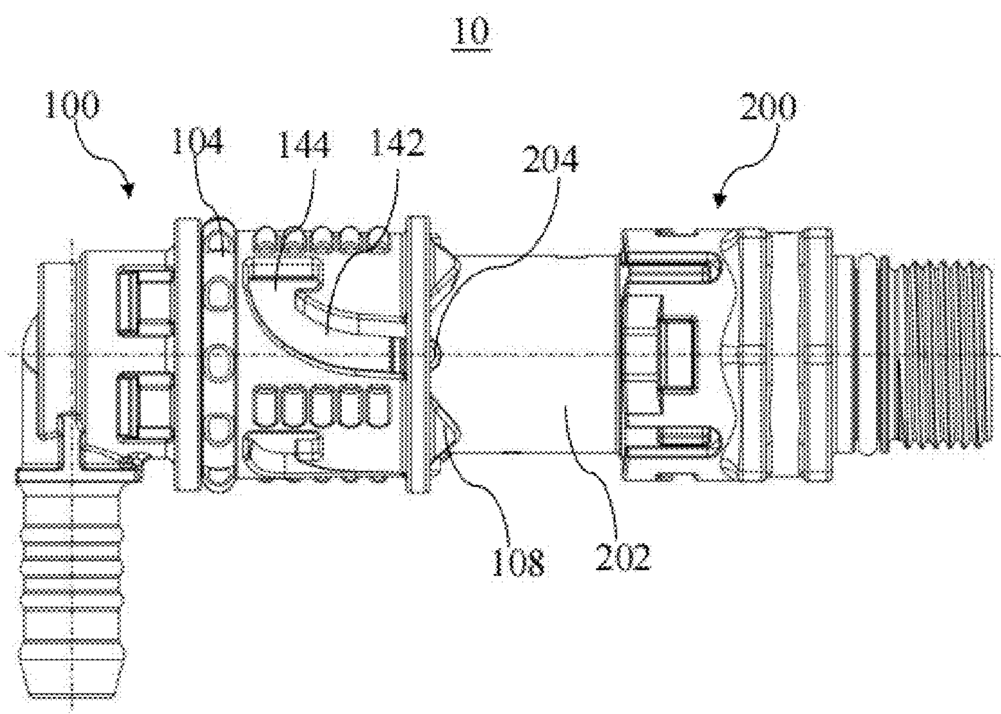
FIGS. 18A and 18B are side and cross-sectional views, respectively, of the first connector and the second connector of the connector assembly according to the second embodiment of the present application, when each locking protrusion just reaches a guiding segment of a corresponding locking slot during the connection of the first connector and the second connector.
Figure 18B:
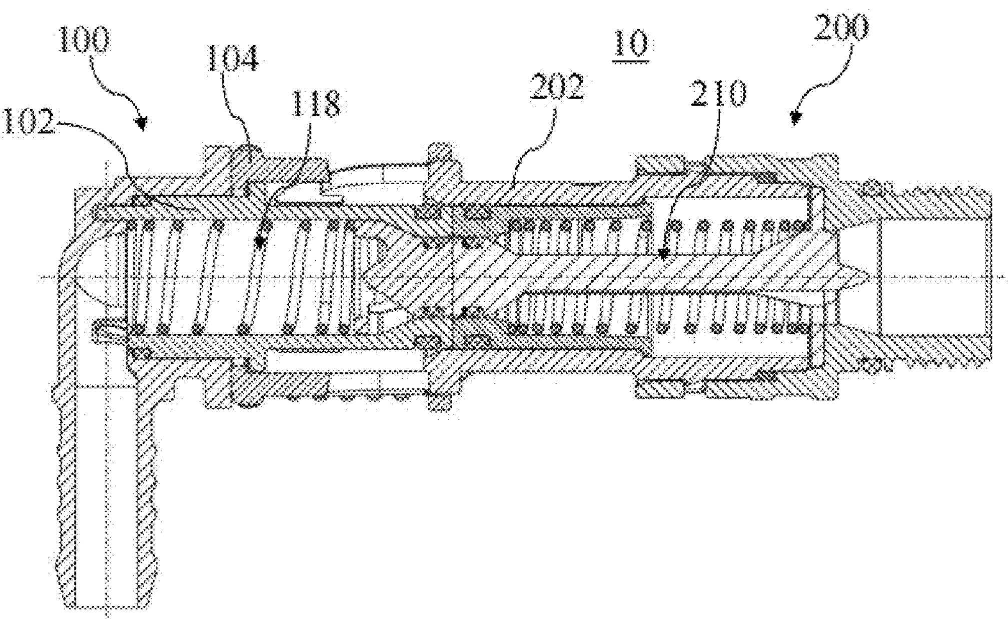
Figure 19A:
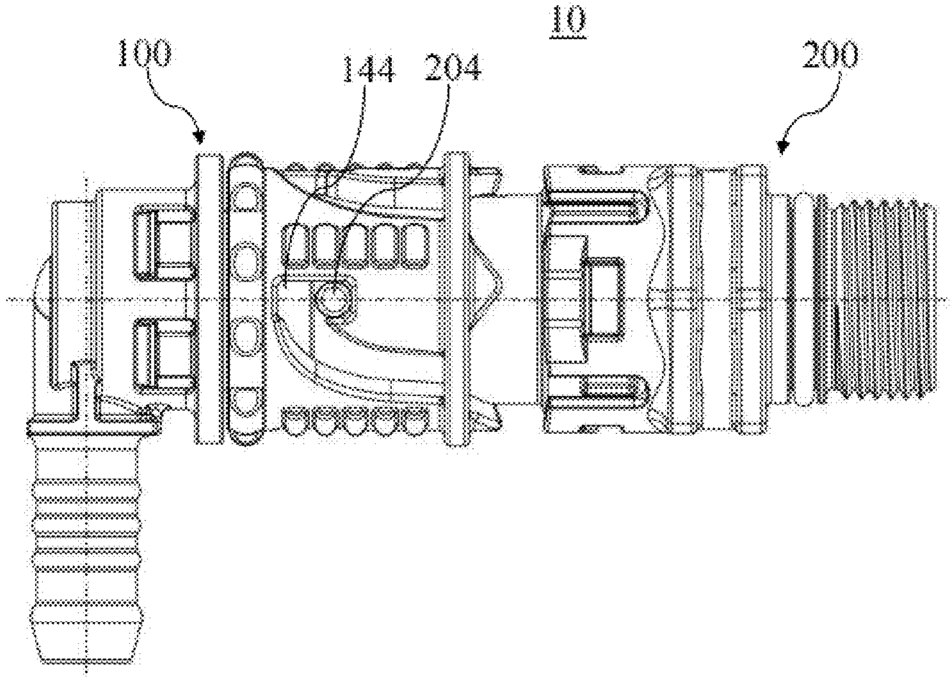
FIGS. 19A and 19B are side and cross-sectional views, respectively, of the first connector and the second connector of the connector assembly according to the second embodiment of the present application, when the connection of the first connector and the second connector is completed with each locking protrusion engaging with a locking segment of a corresponding locking slot.
Figure 19B:
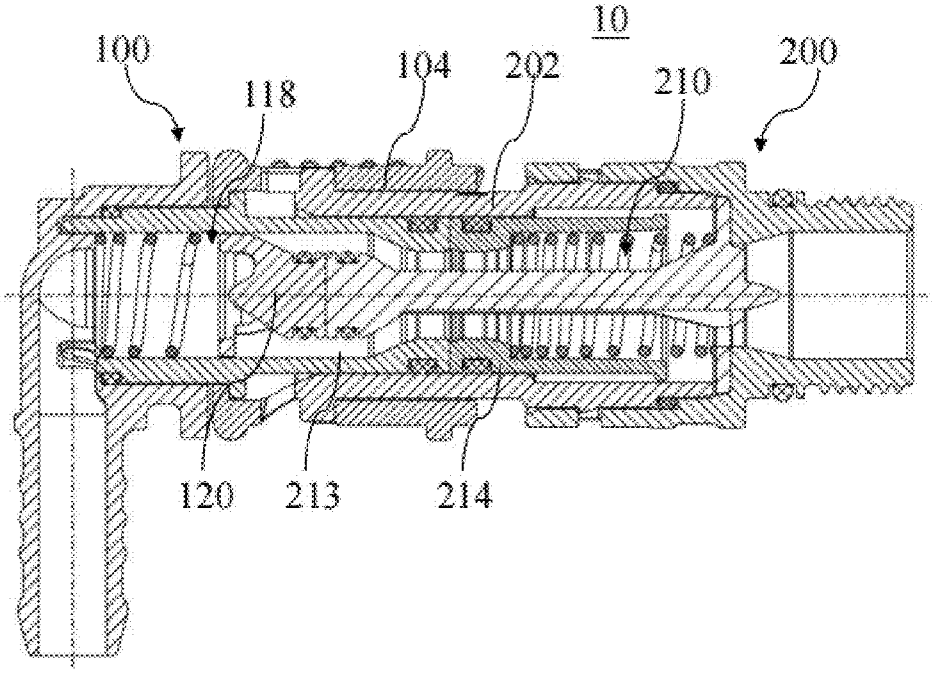

With reference to FIGS. 10, 13, 18B and 19B, the first connector 100 may further include a valve unit 118. The valve unit 118 may be arranged in the first section 112 of the first connector body 102 and configured for controlling the opening and closing of a flow path of the first connector 100. The valve unit 118 may include a valve core 120 and an elastic member 122. The valve core 120 is axially movable between a first closed position (as shown in FIGS. 10 and 18B) and a first open position (as shown in FIG. 19B). When the valve core 120 is in the first closed position, the valve core 120 blocks the port 116 of the first section 112 to close the flow path of the first connector 100, and when the valve core 120 is in the first open position, the valve core 120 is moved away from the port 116 to open the flow path of the first connector 100. One end of the elastic member 122 may abut against the valve core 120, and the other end of the elastic member 122 may abut against the seat 188 of the second section 114, so as to bias the valve core 120 toward the first closed position for blocking the port 116. It is conceivable that, in other embodiments, the second section may not be provided with a seat, but instead a stepped portion may be provided on the inner side of the second section to position the elastic member. When the valve core 120 is pushed by an external force along the first axial direction A1, the valve core 120 can move away from the port 116 to the first open position against the elastic force of the elastic member 122.

With reference to FIGS. 9 to 11 and 18A, the first connector 100 may further include a locking sleeve 104. The locking sleeve 104 may be coaxially sleeved outside the first section 112 of the first connector body 102 in a rotatable manner, so that the locking sleeve 104 can rotate relative to the first connector body 102. At least part of the locking sleeve 104 is confined between the first section 112 and the second section 114 of the first connector body 102 in the first axial direction A1, to limit the axial position of the locking sleeve 104 on the first section 112 of the first connector body 102. In the second embodiment, the locking sleeve 104 has an annular shoulder 136 extending radially inward from a tubular wall 110 of the locking sleeve 104. The first section 112 may have a first limiting portion 138 which is arranged on the outer side the first section 112 and in the form of a substantially annular flange. The second section 114 may have a second limiting portion which may be the receiving end 115*a* of the second section 114. The shoulder 136 of the locking sleeve 104 may be confined between the first limiting portion 138 and the second limiting portion in the first axial direction A1. In the second embodiment, the first limiting portion 138 may further have a cut-off surface 139 for fitting with the assembly tooling to ensure that the first section 112 and the second section 114 are connected/fixed to each other in the correct orientation during assembly.

With reference to FIGS. 9 and 18A, the locking sleeve 104 may include multiple locking slots 106 and multiple guiding protrusions 108. The number of the guiding protrusions 108 may be equal to the number of the locking slots 106. Each locking slot 106 may penetrate through the tubular wall 110 of the locking sleeve 104 and include a guiding segment 142 and a locking segment 144 that meet/adjoin each other. Each guiding protrusion 108 may be arranged at the axial end 132 of the tubular wall 110 and adjacent to the guiding segment(s) 142 of corresponding locking slot(s) 106. The functions of the locking sleeve 104 and its locking slots 106 and guiding protrusions 108 will be further described below.

With reference to FIGS. 9, 15 to 17B, the second connector 200 may include a second connector body 202 defining a flow path. The second connector body 202 may include a tubular first portion 206 and a tubular second portion 208. The first portion 206 may be in the form of a substantially straight tube and defines the second axial direction A2, and the second portion 208 may also be in the form of a substantially straight pipe. The first portion 206 may be at least partially received in and connected/fixed to the second portion 208. It is conceivable that, in other embodiments, the second portion 208 may be in the form of an elbow tube and have any suitable bending angle. The first portion 206 and the second portion 208 may be formed by injection molding. The first portion 206 and the second portion 208 may be made of a flame retardant material such that the second connector 200 may have a certain degree of flame retardance, and thus be suitable for application scenarios (such as for electric vehicles) with flame retardance requirements.

One end of the first portion 206 may include multiple locking protrusions 204 and define an opening 209 through which the first connector body 102 of the first connector 100 can be inserted into the first portion 206. The other end of the first portion 206 may be connected to the second portion 208. The number of the locking protrusions 204 may be equal to the number of the locking slots 106. Each locking protrusion 204 may engage with a corresponding locking slot 106 to connect the first connector 100 with the second connector 200.

Figure 16:
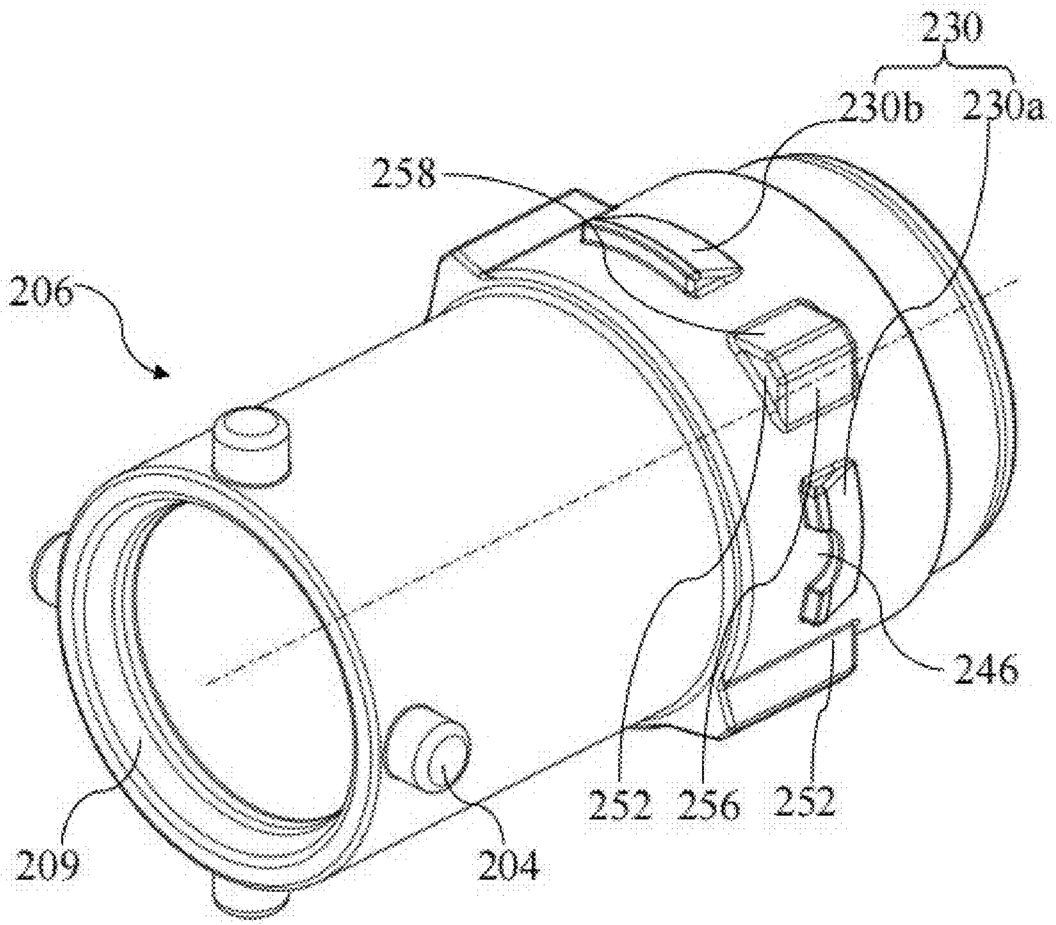
FIG. 16 is a perspective view of a first portion of a second connector body of the second connector of the connector assembly according to the second embodiment of the present application.
Figure 17A:
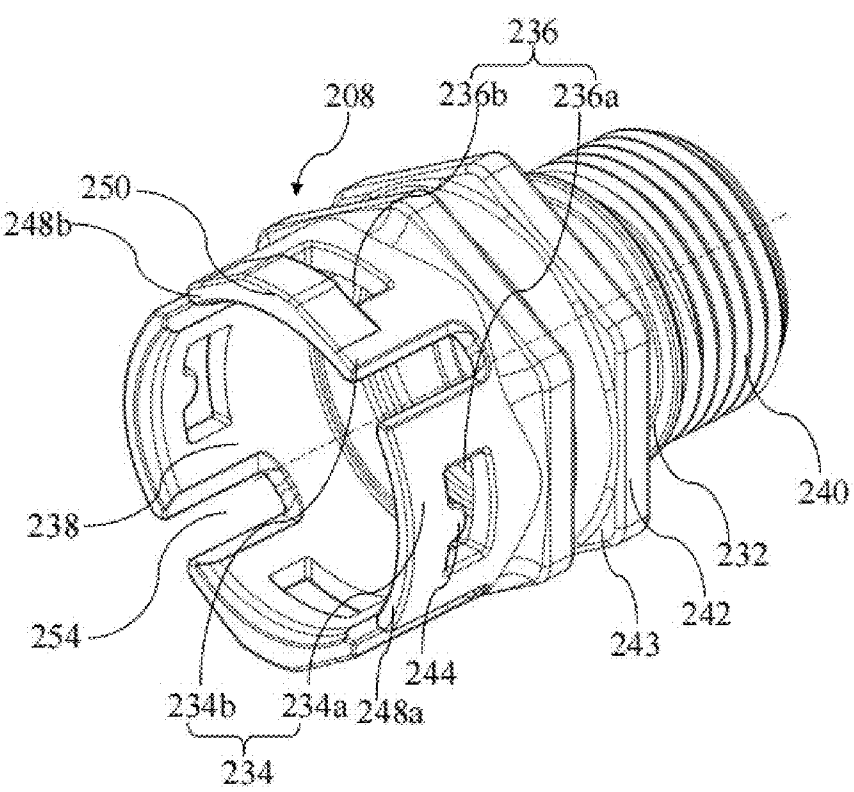
FIGS. 17A and 17B are perspective and front views, respectively, of a second portion of the second connector body of the second connector of the connector assembly according to the second embodiment of the present application.
Figure 17B:
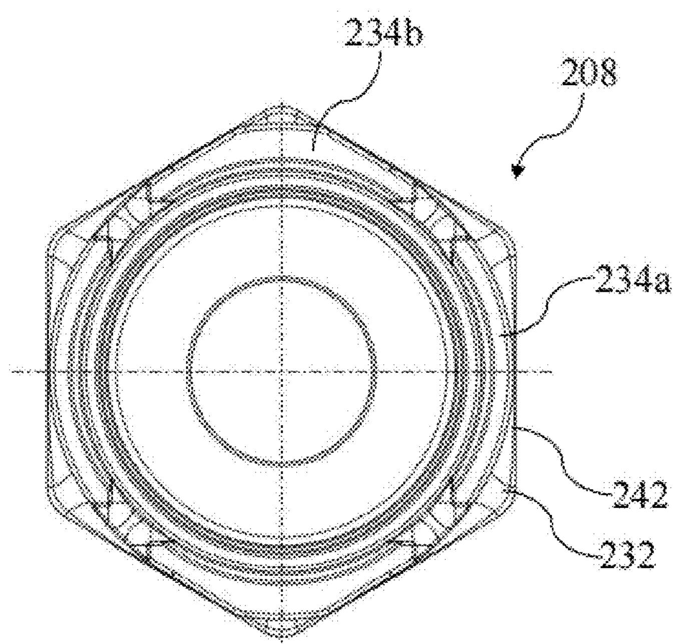

With reference to FIGS. 16 to 17B, the first portion 206 may include multiple engaging projections 230 spaced circumferentially apart from each other. The second portion 208 may include a tubular main body 232 and multiple snapping lugs 234 extending axially from the main body 232 and spaced circumferentially apart from each other. Each snapping lug 234 may include an engaging opening 236. The multiple snapping lugs 234 jointly define an insertion opening 238 of the second portion 208 through which the first portion 206 can be inserted into the second portion 208.

The number of the snapping lugs 234 may be equal to the number of the engaging projections 230. When the first portion 206 is inserted in place within the second portion 208, each engaging projection 230 may engage with the engaging opening 236 of a corresponding snapping lug 234, to limit the axial movement and the circumferential movement of the first portion 206 relative to the second portion 208.

An end of the second portion 208 opposite to the insertion opening 238 may be connected with a fluid pipeline/member (not shown). In the second embodiment, the main body 232 of the second portion 208 may be provided with an external thread 240 to be connected to a fluid pipeline/member (not shown) by a threaded connection. The main body 232 of the second portion 208 may further include at least one circumferential flange 243 having a hexagonal outer contour 242 for engagement with a tool for threaded connection.

The multiple snapping lugs 234 may include first snapping lugs 234*a* and second snapping lugs 234*b* (herein collectively referred to as snapping lugs 234). The multiple engaging projections 230 may include first engaging projections 230*a* adapted to engage with the engaging openings 236*a* of the first snapping lugs 234*a* and second engaging projections 230*b* adapted to engage with the engaging openings 236*b* of the second snapping lugs 234*b*. Herein, the first engaging projection 230*a* and the second engaging projection 230*b* may also be collectively referred to as engaging projections 230; and the engaging opening 236*a* of the first snapping lug 234*a* and the engaging opening 236*b* of the second snapping lug 234*b* may also be collectively referred to as engaging openings 236.

The first snapping lug 234*a* may include a first stiffening projection 244 that projects substantially axially into the engaging opening 236*a* of the first snapping lug 234*a*. The first engaging projection 230*a* includes a receiving recess 246 for receiving the first stiffening projection 244. The first stiffening projection 244 may be located on one side of the engaging opening 236*a* of the first snapping lug 234*a* close to an axial free end 248*a* of the first snapping lug 234*a*, to avoid tensile fracture of the first snapping lug 234*a* when, for example, the second connector 200 is subjected to an external force causing the first portion 206 and the second portion 208 tend to move axially away from each other.

The second snapping lug 234*b* may include a second stiffening projection 250 which is adjacent to the engaging opening 236*b* of the second snapping lug 234*b* and projects substantially radially outward. The second stiffening projection 250 may be located on one side of the engaging opening 236*b* of the second snapping lug 234*b* close to an axial free end 248*b* of the second snapping lug 234*b*, to avoid tensile fracture of the second snapping lug 234*b* when, for example, the second connector 200 is subjected to an external force causing the first portion 206 and the second portion 208 tend to move axially away from each other.

In the second embodiment, the first portion 206 includes four engaging projections 230, and the second portion 208 includes four snapping lugs 234, that is, two first snapping lugs 234*a* and two second snapping lugs 234*b*. The first snapping lugs 234*a* and the second snapping lugs 234*b* are alternately arranged in the circumferential direction of the second portion 208. Compared to the second snapping lug 234*b*, the first snapping lug 234*a* has a relatively small thickness since the first stiffening projection 244 of the first snapping lug 234*a* protrudes substantially axially into the engaging opening 236*a* of the first snapping lug 234*a*. In the second embodiment, the first snapping lug 234*a* may be arranged in a substantially same circumferential orientation as the straight side of the hexagonal outer contour 242 of the main body 232, and the second snapping lug 234*b* may be arranged in a substantially same circumferential orientation as the apex angle of the hexagonal outer contour 242 of the main body 232, such that the outer contour of the multiple snapping lugs 234 does not extend beyond the hexagonal outer contour 242 of the main body 232, and thus the second portion 208 can be easily threaded to the fluid pipeline/member using a tool.

It is conceivable that, in other embodiments, the first portion may include other suitable number of engaging projections, and accordingly, the second portion may include other suitable number of snapping lugs. It will also be appreciated that the above-mentioned structure and position of the stiffening projections of the snapping lugs are illustrative rather than restrictive, and structure and position of the stiffening projections may be designed according to actual needs.

With further reference to FIGS. 16 to 17B, the first portion 206 may further include multiple positioning ribs 252 spaced circumferentially apart from each other. The engaging projections 230 and the positioning ribs 252 may be alternately arranged. A passage 254 may be formed between adjacent snapping lugs of the multiple snapping lugs 234. Each positioning rib 252 may be received within a corresponding passage 254. The positioning rib 252 may be provided to have a triangular cross-section and include a first plane 256 and a second plane 258 which are provided at an angle with respect to each other. The first plane 256 and the second plane 258 of each positioning rib 252 may be in contact with two adjacent snapping lugs 234 defining a corresponding passage 254, respectively.

During the insertion of the first portion 206 into the second portion 208, each positioning rib 252 can slide along a corresponding passage 254, so as to avoid inclination of the central axis of the first portion 206 with respect to the central axis of the second portion 208 during the insertion of the first portion 206 into the second portion 208, thereby facilitating stable and smooth insertion of the first portion 206 into the second portion 208. When the first portion 206 is inserted in place within the second portion 208 and the engaging opening 236 of each snapping lug 234 engages with a corresponding engaging projection 230, the first plane 256 and the second plane 258 of each positioning rib 252 can be in plane-line contact or even plane-plane contact with two adjacent snapping lugs 234, thereby preventing rotation of the first portion 206 with respect to the second portion 208 and further improving the reliability of connection of the first portion 206 with the second portion 208.

In the second embodiment, the multiple positioning ribs 252 have different lengths to fit with the assembly tooling, so as to ensure that the first portion 206 and the second portion 208 are connected/fixed to each other in the correct orientation during assembly.

Figure 15:
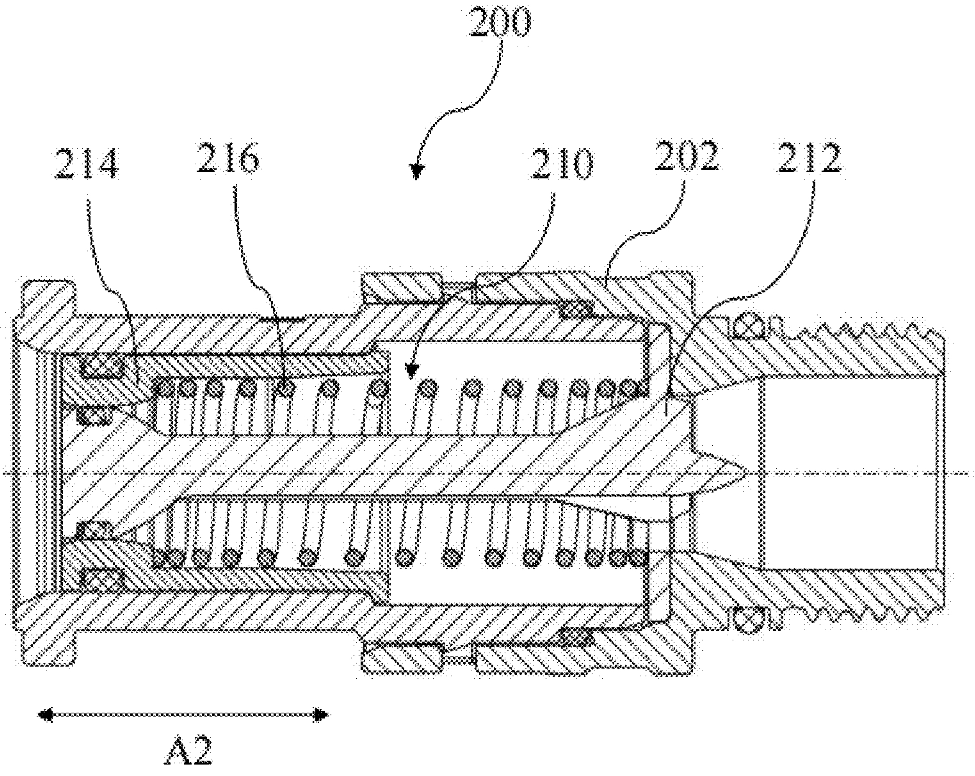
FIG. 15 is a cross-sectional view of the second connector of the connector assembly according to the second embodiment of the present application.

With reference to FIGS. 15, 18B and 19B, the second connector 200 may further include a valve assembly 210. The valve assembly 210 is arranged in the second connector body 202 and configured for controlling the opening and closing of the flow path of the second connector 200. In the second embodiment, the valve assembly 210 may include a valve stem 212, a sliding sleeve 214 and an elastic element 216. The valve stem 212 may be positioned in the second connector body 202 in the second axial direction A2. The sliding sleeve 214 may be sleeved outside the valve stem 212 within the second connector body 202 and be axially slidable between a second closed position (as shown in FIGS. 15 and 18B) and the second open position (as shown in FIG. 19B). When the sliding sleeve 214 is in the second closed position, the sliding sleeve 214 blocks an annular gap 213 (see FIG. 19B) between the first portion 206 of the second connector body 202 and the valve stem 212 to close the flow path of the second connector 200, and when the sliding sleeve 214 is in the second open position, the sliding sleeve 214 is moved away from the annular gap 213 to open the flow path of the second connector 200. In the second embodiment, the elastic element 216 can bias the sliding sleeve 214 toward the second closed position. When the sliding sleeve 214 is pushed by an external force along the second axial direction A2, the sliding sleeve 214 can move away from the annular gap 213 to the second open position against the elastic force of the elastic element 216, so that the flow path of the second connector 200 is opened.

With reference to FIGS. 10, 15, and 18A to 19B, during the connection of the first connector 100 with the second connector 200, the second connector body 202 may firstly be axially inserted between the first connector body 102 and the locking sleeve 104. During the insertion of the second connector body 202 between the first connector body 102 and the locking sleeve 104 (i.e., during the insertion of the second connector body 202 into a space between the first connector body 102 and the locking sleeve 104), the guiding protrusions 108 on the locking sleeve 104 can guide the locking protrusions 204 on the second connector body 202 into the guiding segments 142 of the locking slots 106. Specifically, the locking sleeve 104 can rotate in response to the locking protrusions 204 pushing the guiding protrusions 108, to allow the locking protrusions 204 to move along the guiding protrusions 108 and into the guiding segments 142 of the locking slots 106, as shown in FIGS. 18A and 18B. After entering the guiding segments 142 of the locking slots 106, the locking protrusions 204 can move along the guiding segments 142 and drive the locking sleeve 104 to rotate, until the locking protrusions 204 enters the locking segments 144 of the locking slots 106. After entering the locking segments 144, the locking protrusions 204 may engage with the locking segments 144 by means of the interaction between the valve unit 118 and the valve assembly 210 (for example, the elastic forces of the elastic member 122 and the elastic element 216) to prevent the second connector body 202 from disengaging from the locking sleeve 104, thereby achieving the connection of the first connector 100 with the second connector 200, as shown in FIGS. 19A and 19B. When the first connector 100 has been connected with the second connector 200, the valve core 120 of the first connector 100 is in the first open position, the sliding sleeve 214 of the second connector 200 is in the second open position, and the respective flow paths of the first connector 100 and the second connector 200 are open and in fluid communication with each other.

It should be understood that the embodiments shown in FIGS. 1 to 19B only illustrate the shape, size and arrangement of each optional component of the connector assembly according to the present application. However, these embodiments are merely intended to illustrate, rather than limit. Other shapes, sizes and arrangements may be adopted without departing from the idea and scope of the present application. A person skilled in the art can easily make modifications, variants and equivalents of these embodiments according to the disclosure. For example, feature(s) shown or described as part of one embodiment may be combined with another embodiment to produce yet another embodiment. The present application is intended to cover these modifications, variants and equivalents.

The technical contents and technical features of the present application have been disclosed above. However, it can be understood that, those skilled in the art can make various changes and improvements to the above-disclosed concept under the creative idea of the present application, and all these various changes and improvements still fall within the protection scope of the present application. The description of the foregoing embodiments is exemplary rather than restrictive, and the protection scope of the present application is determined by the appended claims.

The invention claimed is:

1. A connector assembly, comprising a first connector and a second connector for being connected with the first connector, wherein the first connector comprises a first connector body defining an axial direction and a locking sleeve sleeved outside the first connector body and retained on the first connector body in a rotatable manner, wherein the locking sleeve comprises a locking slot provided in a tubular wall of the locking sleeve and a guiding protrusion arranged at an axial end of the tubular wall and adjacent to the locking slot;

wherein the second connector comprises a second connector body configured to be adapted to be inserted between the locking sleeve and the first connector body along the axial direction, and the second connector body comprises a locking protrusion arranged at an outer periphery of the second connector body;

wherein the locking sleeve is configured such that: during the insertion of the second connector body between the locking sleeve and the first connector body along the axial direction, the locking sleeve is capable of rotating in response to the locking protrusion pushing the guiding protrusion, to allow the locking protrusion to move along the guiding protrusion and into the locking slot; wherein the locking protrusion is capable of engaging with the locking slot to prevent the second connector body from disengaging from the locking sleeve.

2. The connector assembly according to claim 1, wherein the locking slot comprises a guiding segment and a locking segment meeting each other, wherein the guiding protrusion is adapted to guide the locking protrusion into the guiding segment, wherein the locking sleeve is configured to be capable of rotating in response to the locking protrusion pushing the guiding segment, to allow the locking protrusion to move along the guiding segment and into the locking segment, and wherein the locking protrusion is capable of engaging with the locking segment to prevent the second connector body from disengaging from the locking sleeve.

3. The connector assembly according to claim 1, wherein the guiding protrusion comprises a guiding surface for guiding the locking protrusion into the locking slot.

4. The connector assembly according to claim 3, wherein the locking sleeve comprises a plurality of locking slots and a corresponding plurality of guiding protrusions, wherein the plurality of locking slots are spaced apart in a circumferential direction of the locking sleeve, and each guiding protrusion is arranged between two adjacent locking slots in the circumferential direction.

5. The connector assembly according to claim 4, wherein the guiding protrusion comprises two guiding surfaces each for guiding the locking protrusion into a corresponding one of two adjacent locking slots.

6. The connector assembly according to claim 5, wherein the guiding protrusion protrudes substantially parallel to the axial direction and tapers in a direction away from the locking sleeve to form the two guiding surfaces on two opposite sides of the guiding protrusion in the circumferential direction; or wherein the two guiding surfaces of the guiding protrusion meet each other.

7. The connector assembly according to claim 3, wherein the guiding surface meets a side wall of the locking slot; or is at an acute angle with respect to a plane perpendicular to the axial direction, optionally where the acute angle ranges between 30° and 60°.

8. The connector assembly according to claim 1, wherein the locking sleeve comprises an extending portion, wherein the extending portion is arranged on the tubular wall and extends across at least one of the locking slot and a gap between adjacent guiding protrusions.

9. The connector assembly according to claim 8, wherein the extending portion extends along an entire circumference of the locking sleeve.

10. The connector assembly according to claim 1, wherein the first connector body comprises a tubular first section and a tubular second section, wherein the first section is at least partially received in the second section and is connected to the second section;

wherein the first section comprises at least one outer bearing surface arranged on an outer side of the first section, and the second section comprises at least one inner bearing surface arranged on an inner side of the second section, wherein each outer bearing surface is adapted to abut against a corresponding inner bearing surface to bear a lateral load substantially perpendicular to an axial direction of the first section at a joint between the first section and the second section, and the at least one outer bearing surface and the at least one inner bearing surface extend nonparallel to a direction of the lateral load.

11. The connector assembly according to claim 10, wherein the at least one outer bearing surface and the at least one inner bearing surface are planar; or the at least one outer bearing surface and the at least one inner bearing surface extend substantially perpendicular to the direction of the lateral load.

12. The connector assembly according to claim 10, wherein the first section comprises at least one rib arranged on the outer side of the first section, wherein each rib comprises a first end surface and a second end surface in a circumferential direction of the first section, and wherein at least one of the first end surface and the second end surface of the at least one rib form one or more of the at least one outer bearing surface.

13. The connector assembly according to claim 12, wherein the first end surface and the second end surface of the rib are parallel to each other.

14. The connector assembly according to claim 12, wherein the second section comprises at least one engaging protrusion arranged on the inner side of the second section; wherein the at least one outer bearing surface comprises at least one first outer bearing surface formed by the first end surface of the rib; wherein the at least one inner bearing surface comprises at least one first inner bearing surface formed by a surface of the engaging protrusion; and wherein each first outer bearing surface is adapted to abut against a corresponding first inner bearing surface.

15. The connector assembly according to claim 14, wherein the at least one rib comprises a first rib and a second rib which are adjacent to each other and spaced apart from each other in the circumferential direction of the first section, wherein the first outer bearing surface formed by the first end surface of the first rib is adapted to abut against the first inner bearing surface formed by a first side surface of a corresponding engaging protrusion of the at least one engaging protrusion, and the first outer bearing surface formed by the first end surface of the second rib is adapted to abut against the first inner bearing surface formed by a second side surface of the corresponding engaging protrusion opposite to the first side surface.

16. The connector assembly according to claim 12, wherein the at least one outer bearing surface comprises at least one second outer bearing surface formed by the second end surface of the rib; wherein the at least one inner bearing surface comprises at least one second inner bearing surface formed by part of an inner surface of the second section; and wherein each second outer bearing surface is adapted to abut against a corresponding second inner bearing surface.

17. The connector assembly according to claim 1, wherein the first connector body comprises a tubular first section and a tubular second section, wherein the second section comprises a receiving end, wherein the first section is adapted to be at least partially inserted into the second section in an insertion direction via the receiving end and be connected to the second section.

18. The connector assembly according to claim 17, wherein the first section comprises a plurality of abutting projections spaced circumferentially apart from each other; wherein the second section comprises a plurality of abutting cantilevers spaced circumferentially apart from each other; and wherein each abutting projection is capable of abutting against a free end of a corresponding abutting cantilever to limit movement of the first section relative to the second section in a direction opposite to the insertion direction.

19. The connector assembly according to claim 18, wherein the abutting cantilever has a substantially uniform thickness; or wherein the abutting cantilever extends from the receiving end toward an interior of the second section at an acute angle with respect to the insertion direction.

20. The connector assembly according to claim 17, wherein the first section comprises a first annular stepped portion on an outer side of the first section; wherein the second section comprises a second annular stepped portion on an inner side of the second section; and wherein the first connector comprises a sealing member, and the first annular stepped portion and the second annular stepped portion together define an accommodating space for accommodating the sealing member.

21. The connector assembly according to claim 20, wherein the first section comprises an axial end inserted into the second section and the axial end of the first section comprises an outer chamfer.

22. The connector assembly according to claim 17, wherein the second section is in the form of an elbow tube, wherein the first section comprises an axial end inserted into the second section, and the axial end of the first section is located at a turning of the second section; and wherein a circumferential wall of the first section is provided with a communicating port at the axial end of the first section, and the first section is in fluid communication with the second section via the communicating port.

23. The connector assembly according to claim 18, wherein the second section comprises a plurality of windows spaced circumferentially apart from each other; wherein each abutting cantilever is located in a corresponding window; and wherein each abutting projection is capable of abutting against an edge of a corresponding window to limit movement of the first section relative to the second section in the insertion direction.

24. The connector assembly according to claim 1, wherein the second connector body comprises a tubular first portion and a tubular second portion, wherein the first portion is at least partially received in the second portion and is connected to the second portion;

wherein the first portion comprises a plurality of engaging projections spaced circumferentially apart from each other, wherein the second portion comprises a tubular main body and a plurality of snapping lugs extending substantially axially from the main body and spaced circumferentially apart from each other, wherein each snapping lug comprises an engaging opening, and wherein each engaging projection is adapted to engage with the engaging opening of a corresponding snapping lug, to limit movement of the first portion relative to the second portion.

25. The connector assembly according to claim 24, wherein the plurality of snapping lugs comprise at least one of a first snapping lug and a second snapping lug, the first snapping lug comprises a first stiffening projection projecting substantially axially into the engaging opening of the first snapping lug, and the second snapping lug comprises a second stiffening projection adjacent to the engaging opening of the second snapping lug and projecting substantially radially outward.

* * * * *